United States Patent [19]

Yamagami et al.

[11] Patent Number: 5,072,290
[45] Date of Patent: Dec. 10, 1991

[54] COLOR IMAGE SIGNAL ENCODING DEVICE

[75] Inventors: Taku Yamagami; Makoto Takayama, both of Kanagawa, Japan

[73] Assignee: Canon Kabushiki Kaisha, Tokyo, Japan

[21] Appl. No.: 413,954

[22] Filed: Sep. 28, 1989

Related U.S. Application Data

[63] Continuation of Ser. No. 306,277, Feb. 1, 1989.

[30] Foreign Application Priority Data

Sep. 19, 1986 [JP] Japan .................. 61-221637
Sep. 19, 1986 [JP] Japan .................. 61-221638
Sep. 19, 1986 [JP] Japan .................. 61-221639
Sep. 19, 1986 [JP] Japan .................. 61-221640

[51] Int. Cl.$^5$ ........................................... H04N 11/04
[52] U.S. Cl. ...................... 358/13; 358/138; 358/135
[58] Field of Search .................. 358/13, 12, 138, 135, 358/136, 133

[56] References Cited

U.S. PATENT DOCUMENTS 4,716,453 12/1987 Pawelski .................. 358/138 X
4,875,090 10/1989 Shimokoriyama et al. ......... 358/12

Primary Examiner—Victor R. Kostak
Attorney, Agent, or Firm—Robin, Blecker Daley & Driscoll

[57] ABSTRACT

An adaptive type differential encoding method and a device for differentially encoding a color image signal consisting of a plurality of component signals are arranged: To form sample signals for the component signals by sampling the color image signal for every component signal thereof; to form differential signals for the component signals by using the sample signals; to set an allowable quantization error at least for one of the plurality of component signals; to set quantizing characteristics for the differential signals according to the size of the allowable quantization error; and to quantize and encode the differential signals on the basis of the set quantizing characteristics. The arrangement takes the visual perception characteristic of man and enables a differential encoding process to be efficiently accomplished on the color image signal without causing any conspicuous signal deterioration.

8 Claims, 22 Drawing Sheets

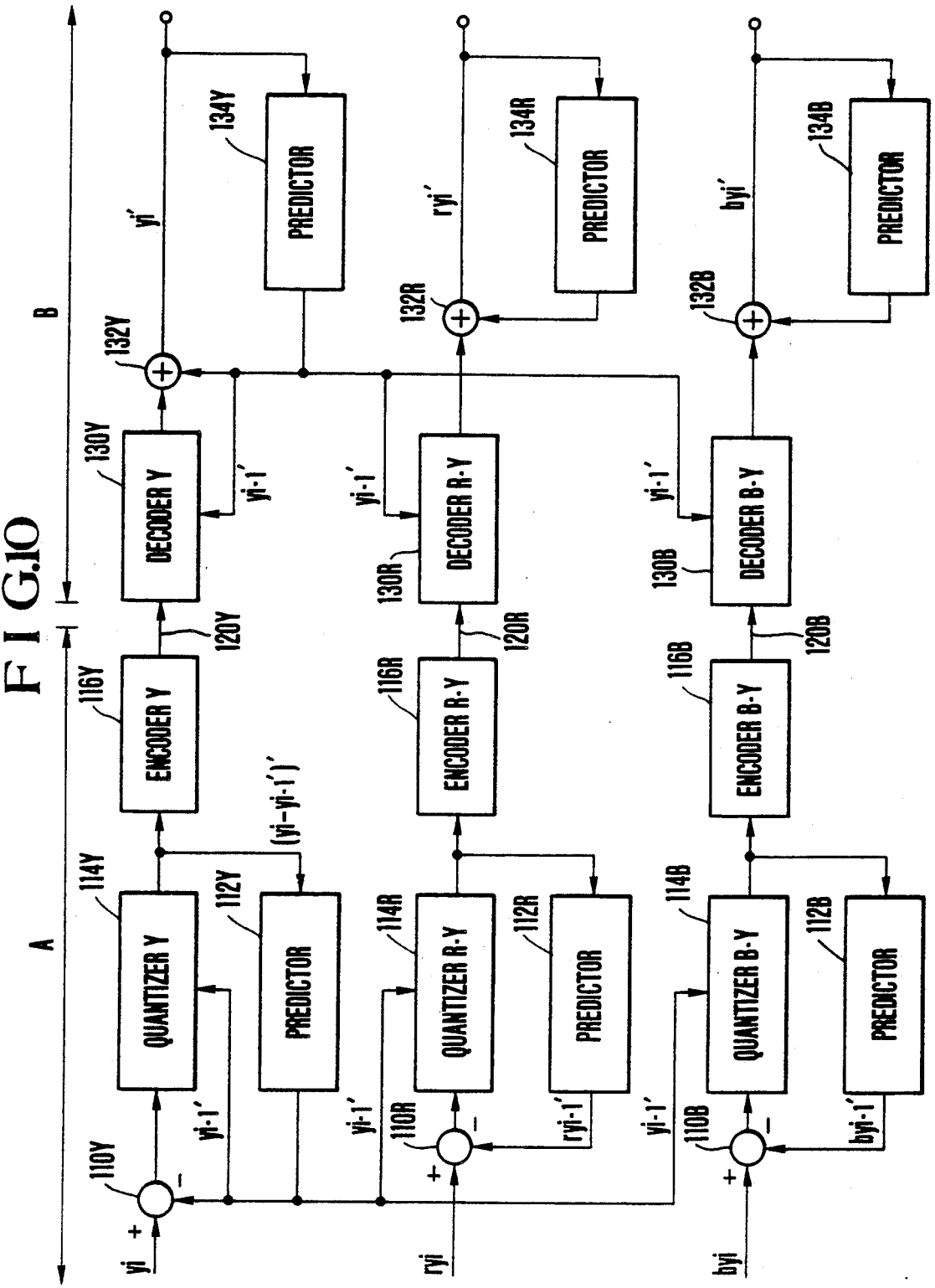

○ SAMPLING POINTS OF Y
△ SAMPLING POINTS OF R-Y AND B-Y

| REPRESENTING VALUE | CODE |
|---|---|
| 11 | 0 0 0 1 1 1 1 |
| 10 | 0 0 0 1 1 1 0 |
| 9  | 0 0 0 1 1 0 1 |
| 8  | 0 0 0 1 1 0 0 |
| 7  | 0 0 0 1 0 1 1 |
| 6  | 0 0 0 1 0 1 0 |
| 5  | 0 0 0 1 0 0 1 |
| 4  | 0 0 0 1 0 0 0 |
| 3  | 1 1 0 |
| 2  | 1 0 1 |
| 1  | 1 0 0 |
| 0  | 1 1 0 |
| -1 | 0 0 1 |
| -2 | 0 1 0 |
| -3 | 0 1 1 |
| -4 | 0 0 0 0 0 0 0 |
| -5 | 0 0 0 0 0 0 1 |
| -6 | 0 0 0 0 0 1 0 |
| -7 | 0 0 0 0 0 1 1 |
| -8 | 0 0 0 0 1 0 0 |
| -9 | 0 0 0 0 1 0 1 |
| -10| 0 0 0 0 1 1 0 |
| -11| 0 0 0 0 1 1 1 |

| REPRESENTING VALUE | CODE |
|---|---|
| 3  | 0 0 0 0 0 1 |
| 2  | 0 0 0 1 |
| 1  | 0 1 |
| 0  | 1 |
| -1 | 0 0 1 |
| -2 | 0 0 0 0 1 |
| -3 | 0 0 0 0 0 0 1 |

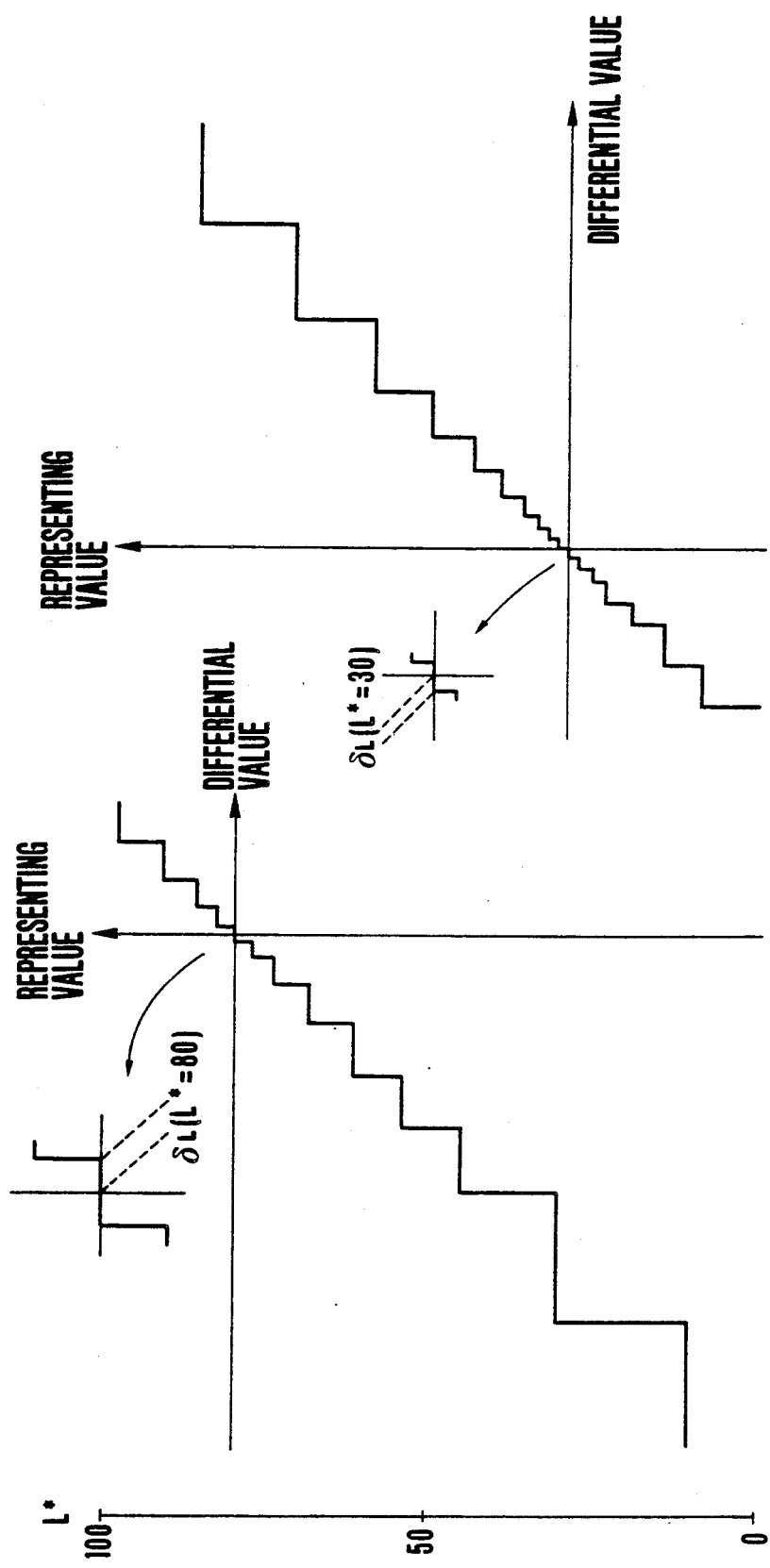

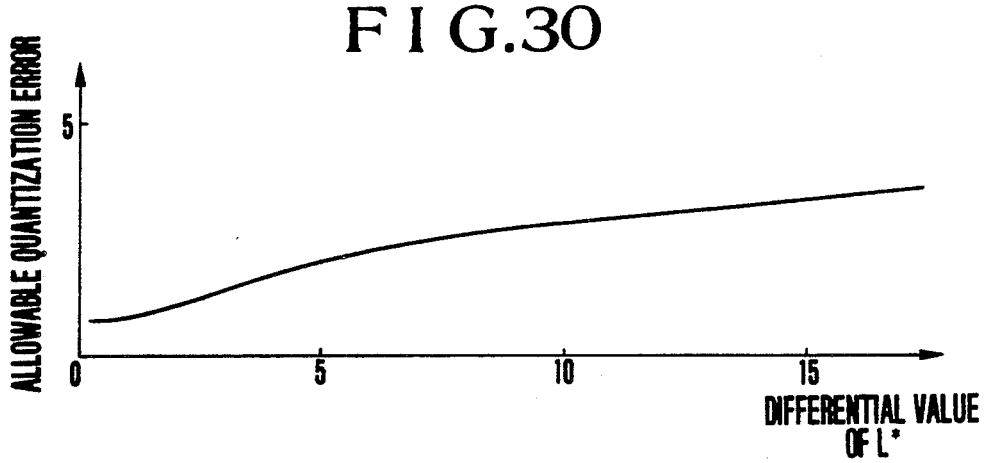
F I G. 30
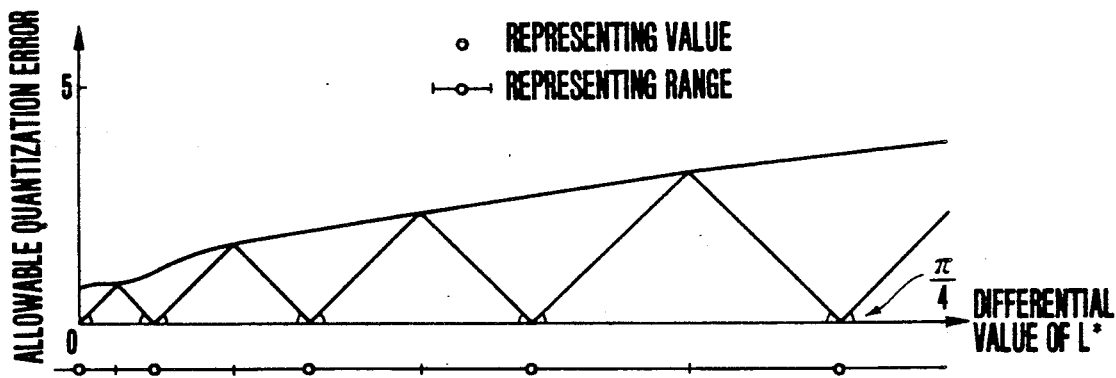
F I G. 31
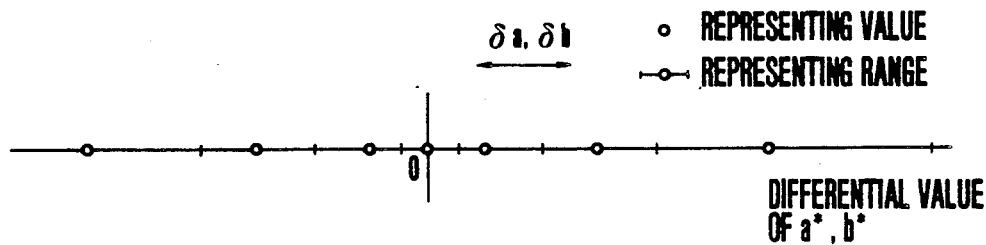
F I G. 32

COLOR IMAGE SIGNAL ENCODING DEVICE

This application is a continuation of application Ser. No. 306,277, filed Feb. 1, 1989.

BACKGROUND OF THE INVENTION

1. Field of the Invention

This invention relates to a differential encoding method and a device for carrying out the method and more particularly to an adaptive type differential encoding method and a device which compresses color image signals.

2. Description of the Related Art

Transmission systems for transmission of digital image information in a compressed state have recently come to be actively developed for TV conference systems and full-color transmission of still pictures. Among known methods for such transmission, a differential pulse code modulation (hereinafter referred to as DPCM) method has attracted attention and considered to be effective especially for digital transmission of image information through a narrow band transmission route. In the DPCM method of the prior art, color images are expressed by colorimetric systems of YIQ, Y·R-Y·B-Y, CIELAB, CIELUB, etc.; and, for each of the three parameters of colorimetric systems, a differential value is obtained and quantized.

These colorimetric systems, however, do not always present uniform spaces in terms of human visual perception. A color difference visually perceptible by man for a change taking place among colors of the same norm greatly varies with their positions within the colorimetric system. In the conventional DPCM method, therefore, data has not been compressed in a manner apposite to the characteristic of visual sensation of man.

SUMMARY OF THE INVENTION

It is a general object of this invention to provide an adaptive type differential encoding method for solving the above stated problem and a device for carrying out the method.

It is a more specific object of this invention to provide an adaptive type predictive differential encoding method by which color image signals can be differentially encoded with the visual sensation characteristic of man duly taken into consideration for lessening deterioration of picture quality.

Under this object, an adaptive type differential encoding method which embodies this invention for differentially encoding a color image signal consisting of a plurality of component signals comprises: a first step of sampling every component signal of the color image signal to form a sample signal; a second step of forming a differential signal for each of the component signal by using a sample signals formed by the first step; a third step of setting an allowable quantization error at least for one of the plurality of component signals; and a fourth step arranged to set a quantizing characteristic for each of differential signals formed by the second step in accordance with the size of the allowable quantization error set by the third step and to quantize and encode the differential signal on the basis of the set quantizing characteristic.

It is another object of this invention to provide an adaptive type differential encoding method in which a color image signal can be differentially encoded in a simple manner without degrading picture quality with the characteristic of the visual sensation of man duly taken into consideration.

Under that object, an adaptive type differential encoding method arranged as an embodiment of this invention to differentially encode a color image signal consisting of a plurality of component signals including a lightness signal representing a degree of lightness comprises: a first step by which the color image signal is sampled for each of the component signals to form thereby a sample signal; a second step by which a differential signal is formed for each of the component signals by using the sample signal of each of the component signals formed by the first step; a third step by which an allowable quantization error is set for the lightness signal included in the plurality of component signals; and a fourth step by which a quantizing characteristic is set for each of the differential signals formed by the second step in accordance with the size of the allowable quantization error set by the third step and the differential signal is quantized and encoded on the basis of the set quantizing characteristic.

It is a further object of this invention to provide a color image signal processing device which is capable of digitizing and processing a color image signal by lessening deterioration of picture quality with the characteristic of the visual sensation or perception of man duly taken into consideration.

Under this object, a color image signal processing device arranged according to this invention as an embodiment thereof to process a color image signal consisting of a plurality of component signals comprises: sampling means which is arranged to sample the color image signal for every component signal thereof and to form sample signals; predictive signal forming means which is arranged to form a predictive signal for each of the component signals; differential signal forming means which is arranged to form a differential signal for each of the component signals by using the sample signal formed by the sampling means and the predictive signal formed by the predictive signal forming means; and quantizing means which is arranged to quantize each of the differential signals formed by the differential signal forming means in accordance with at least one of quantizing characteristics apposite to the size of the predictive signal formed for one of the component signals.

The above and other objects and features of the invention will become apparent from the following detailed description of embodiments thereof taken in connection with the accompanying drawings.

Figure 7:
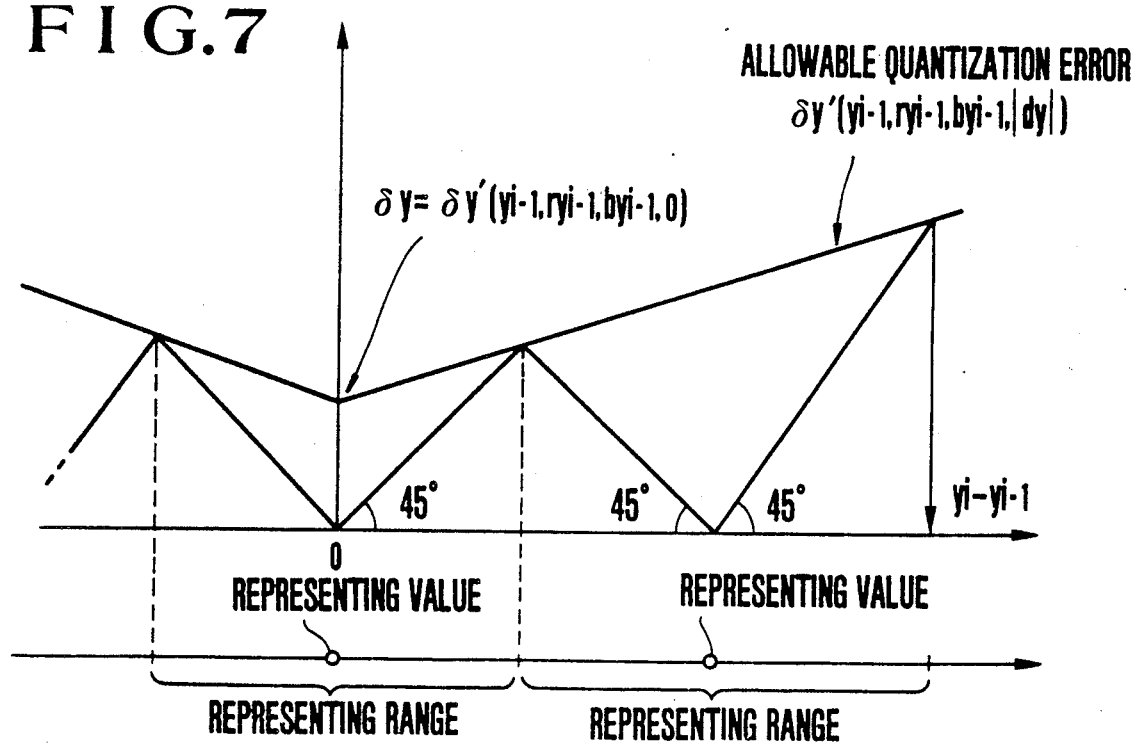
FIG. 7 shows a designing method for obtaining a non-linear quantizing characteristic.

show examples of the non-linear quantizing characteristic determined by the method of FIG. 7.

Figure 11A:
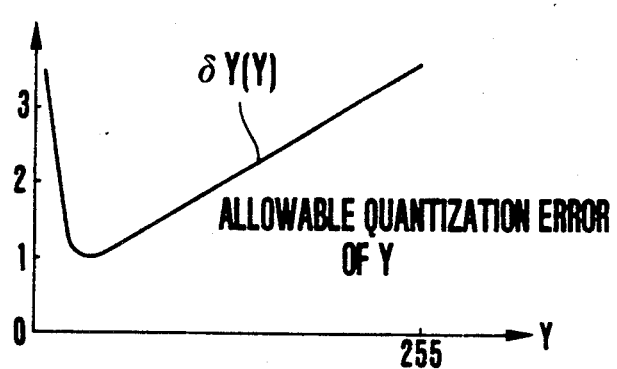
Figure 11B:
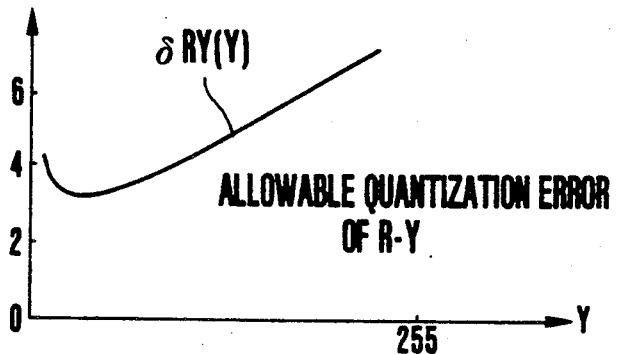
Figure 11C:
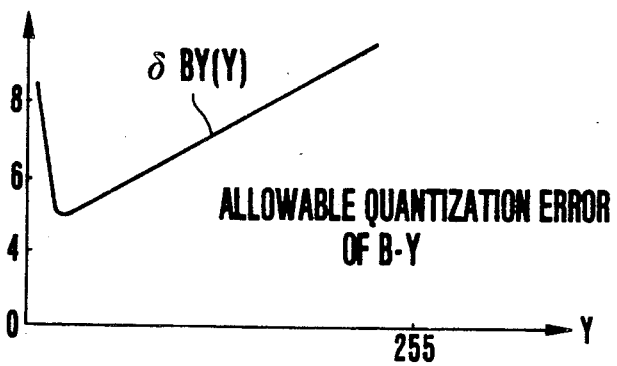
Figure 12:
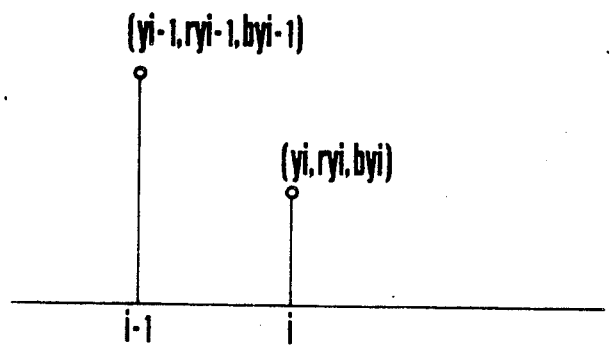
Figure 13A:
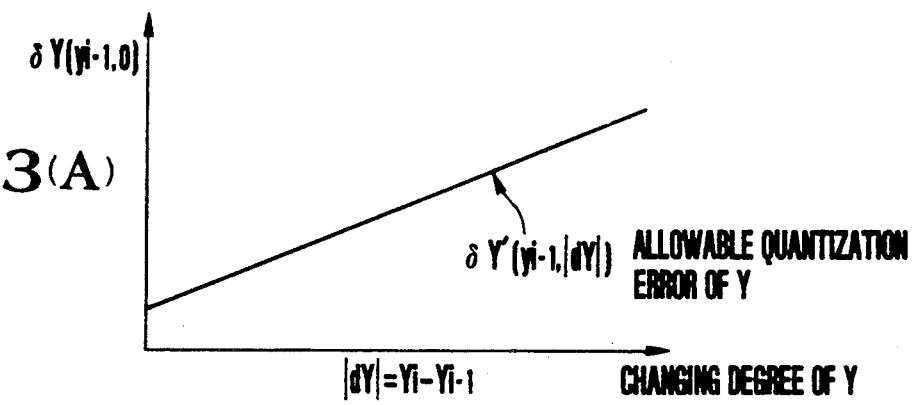
Figure 13B:
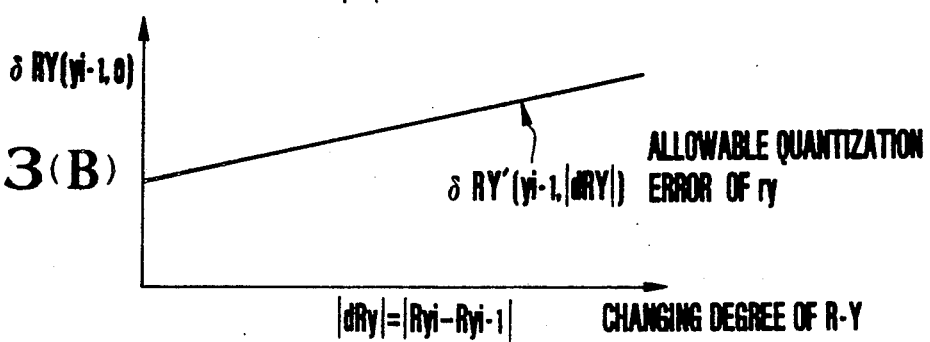
Figure 13C:
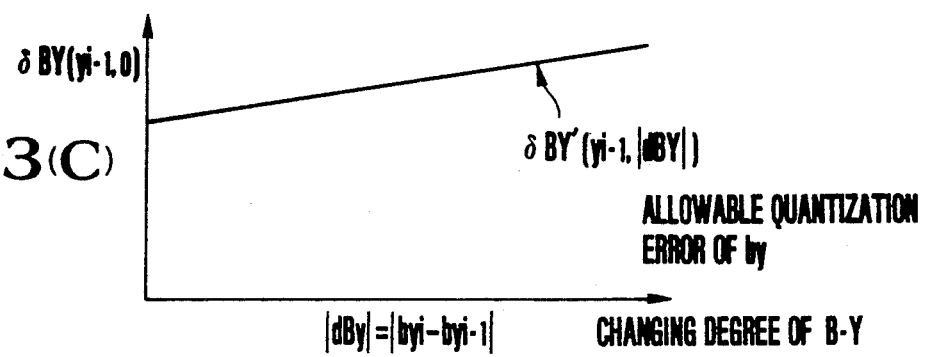

FIG. 10 is a block diagram showing a signal transmitting and receiving circuit arrangement to which this invention is applied as a second embodiment thereof. FIGS. 11(A) to 11(C) show allowable quantization errors for components signals of a colorimetric system of Y·R-Y·B-Y as in relation to a luminance signal Y. FIG. 12 shows color components obtained at consecutive time points i-l and i. FIGS. 13(A) to 13(C) show quantization errors allowable to the components of a color image signal when the color image signal obtained at a time point i is to be differentially quantized. FIGS. 14(A) to 15(B) show by way of example non-linear quantizing characteristics determined by the characteristics shown in FIGS. 13.

Figure 16:
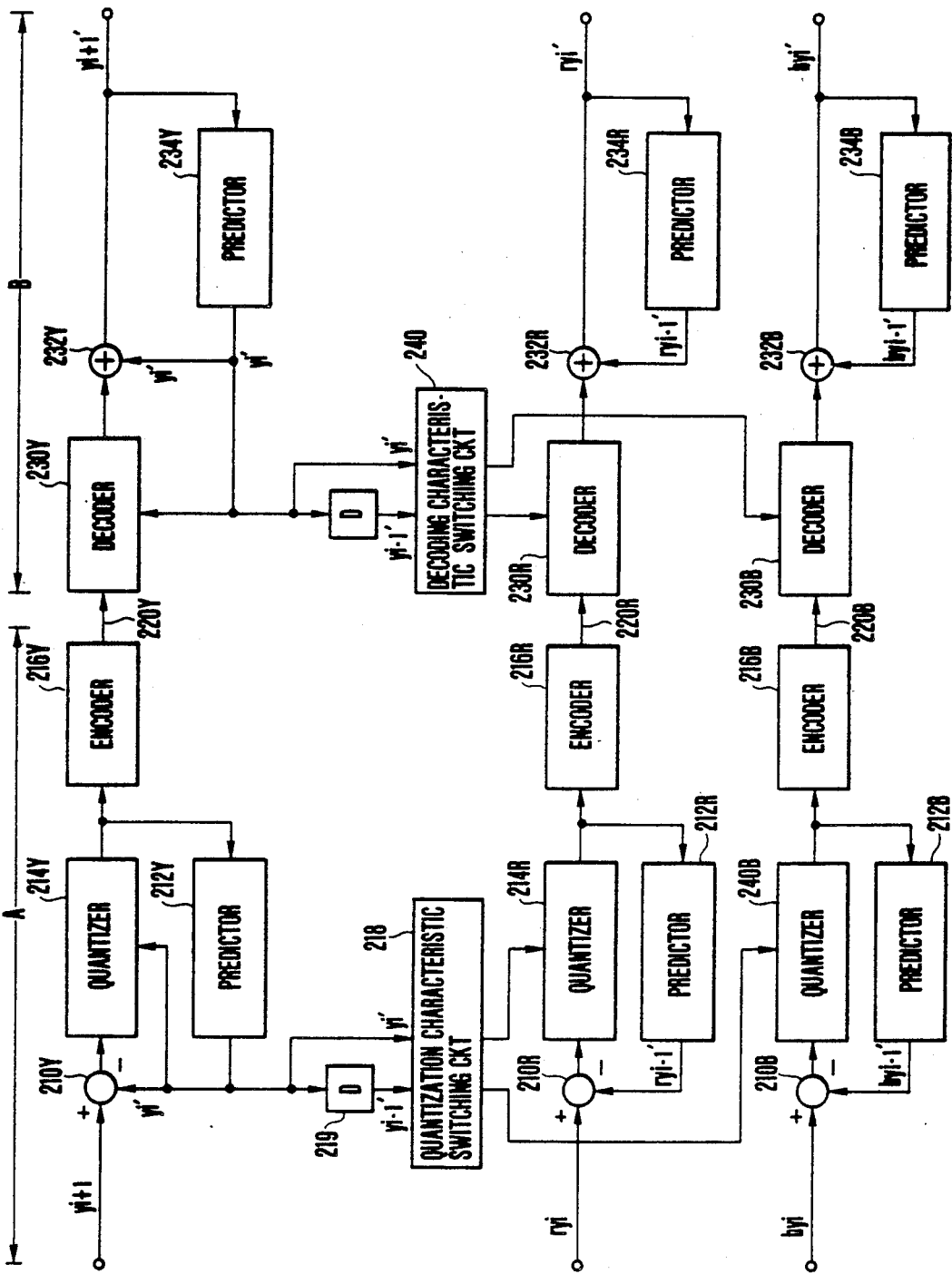

FIG. 16 is a block diagram showing a signal transmitting and receiving circuit arrangement to which this invention is applied as a third embodiment thereof.

Figure 17:
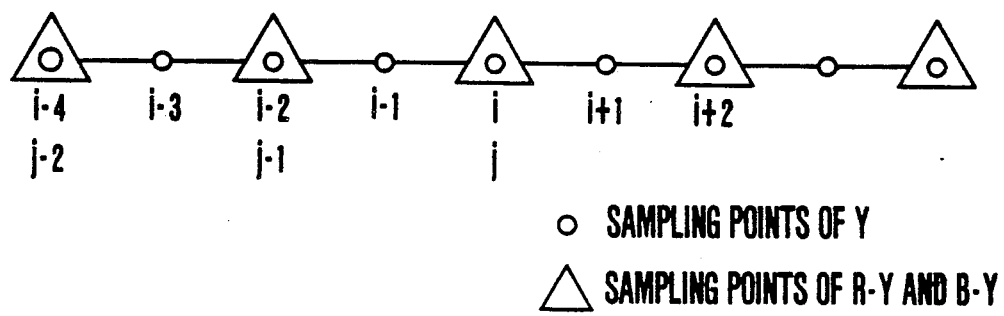
Figure 19:
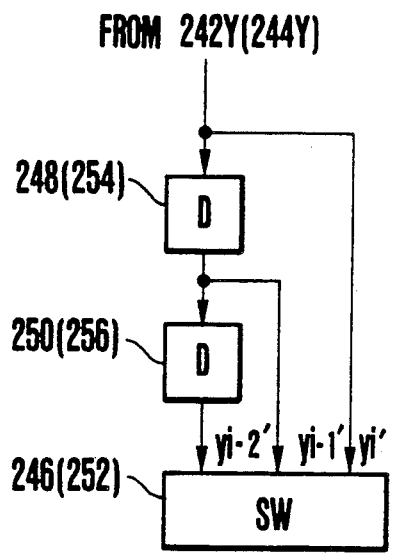
Figure 18:
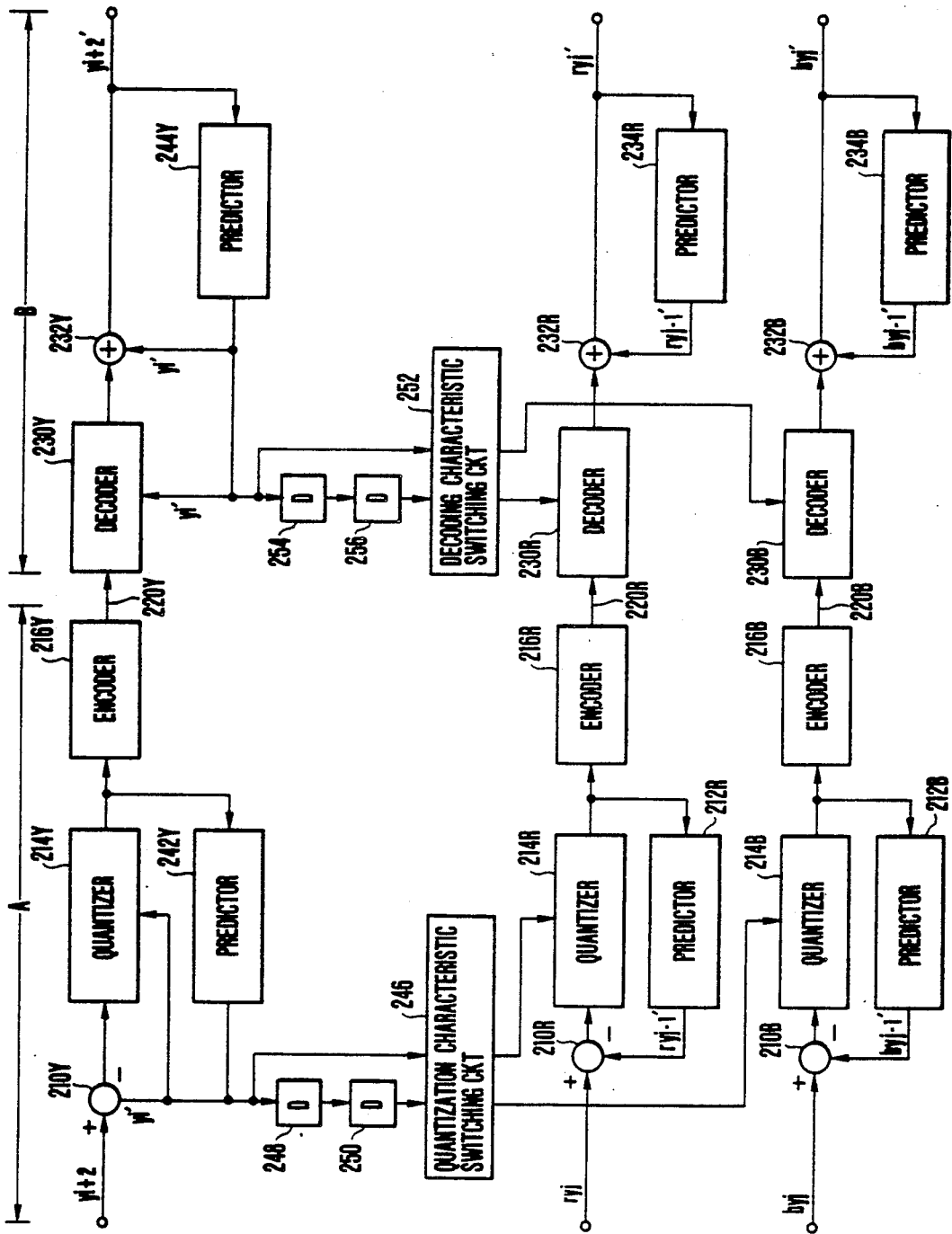

FIG. 17 shows sampling points of the luminance signal Y of the NTSC color system as in relation to those of other signals R-Y and B-Y, which are sampled in a cycle twice as long as the sampling cycle of the signal Y. FIG. 18 is a block diagram showing a signal transmitting and receiving circuit arranged to use the sample signals of FIG. 17 by the same circuit arrangement as that of FIG. 16. FIG. 19 is a circuit diagram showing by way of example a modification of the circuit of FIG. 18. FIGS. 20(A) to 21(B) show by way of example non-linear quantizing characteristics to be employed by the same embodiment.

Figure 22:
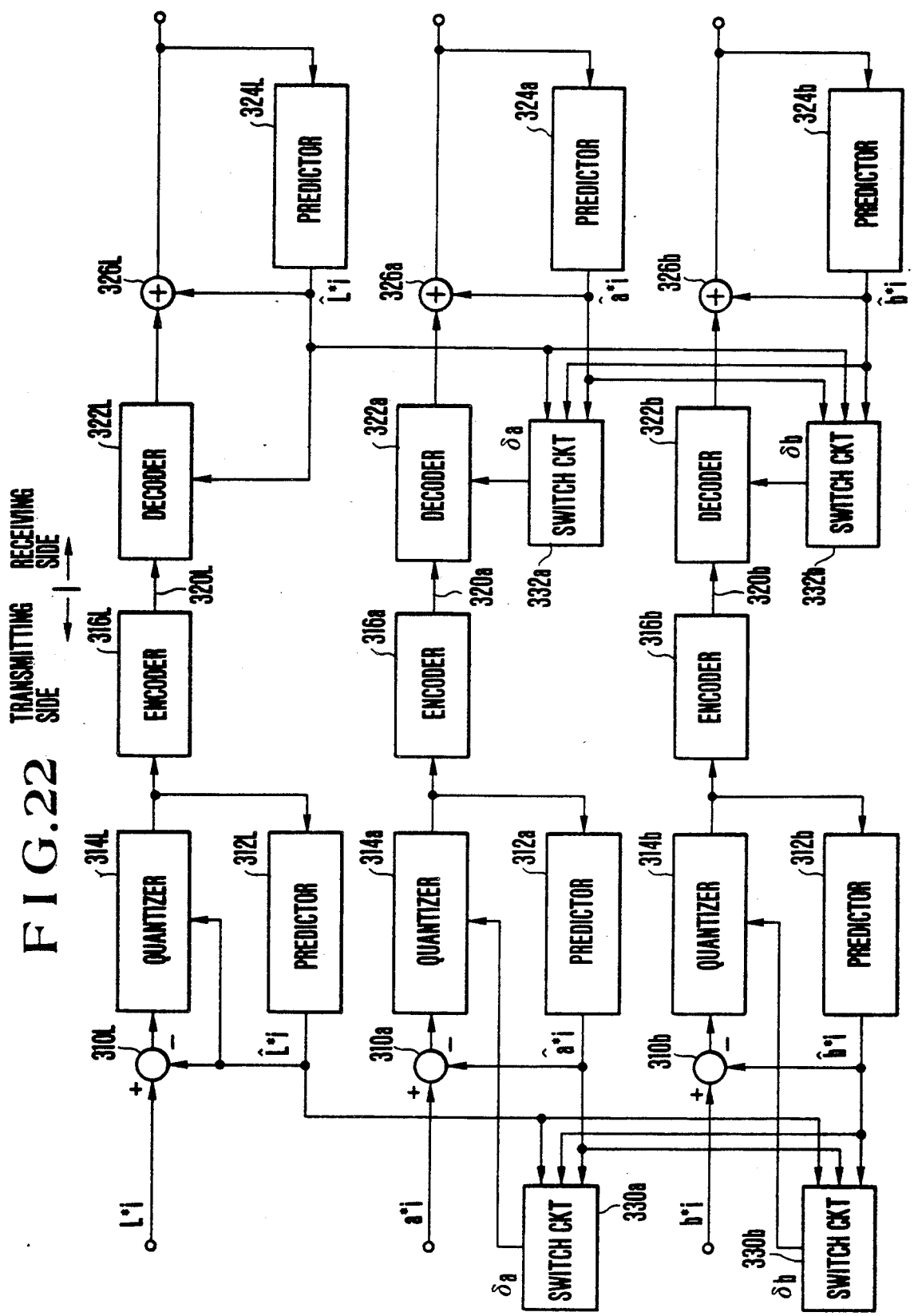
Figures 23, 24, 25:
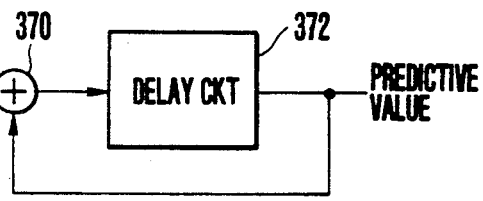
Figure 26A:
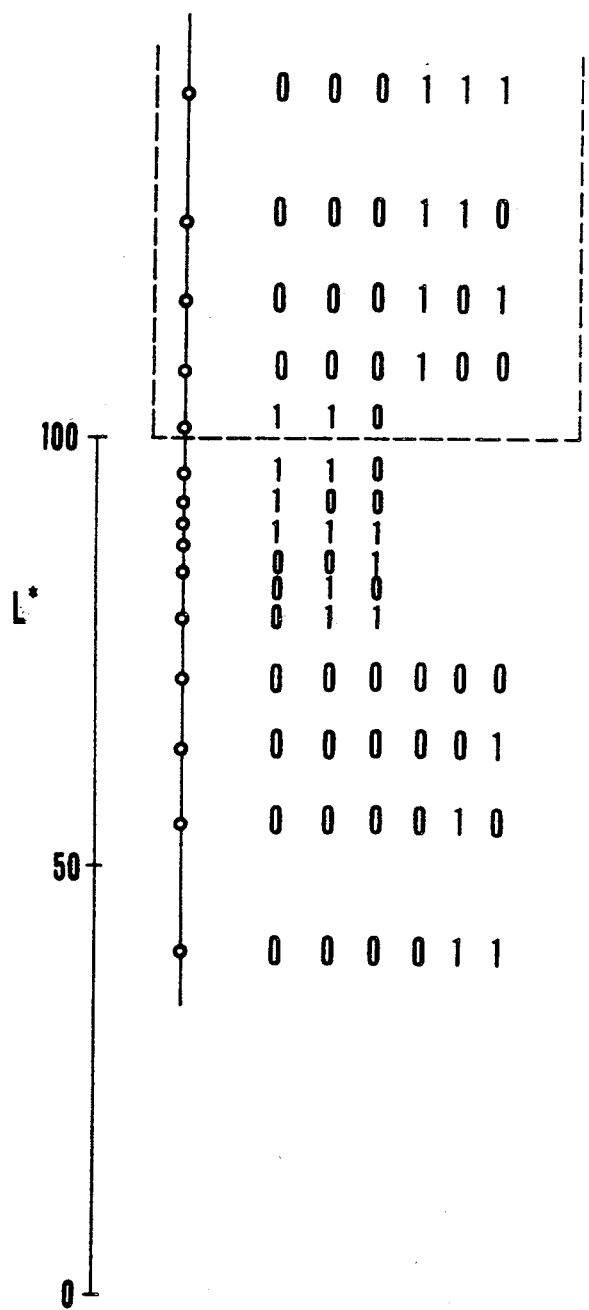
Figure 26B:
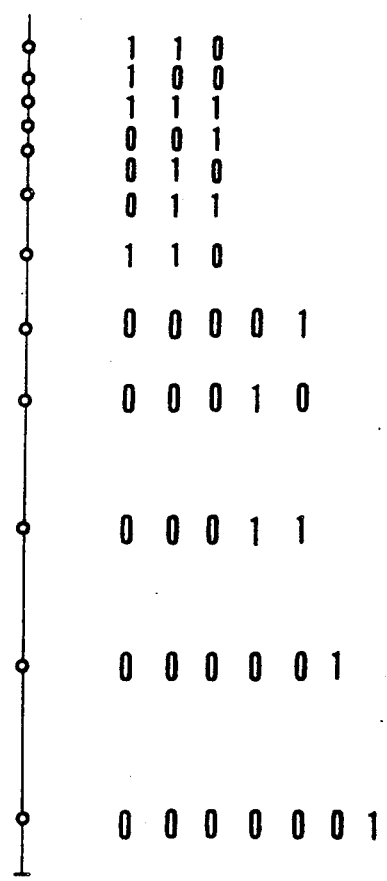
Figure 27:
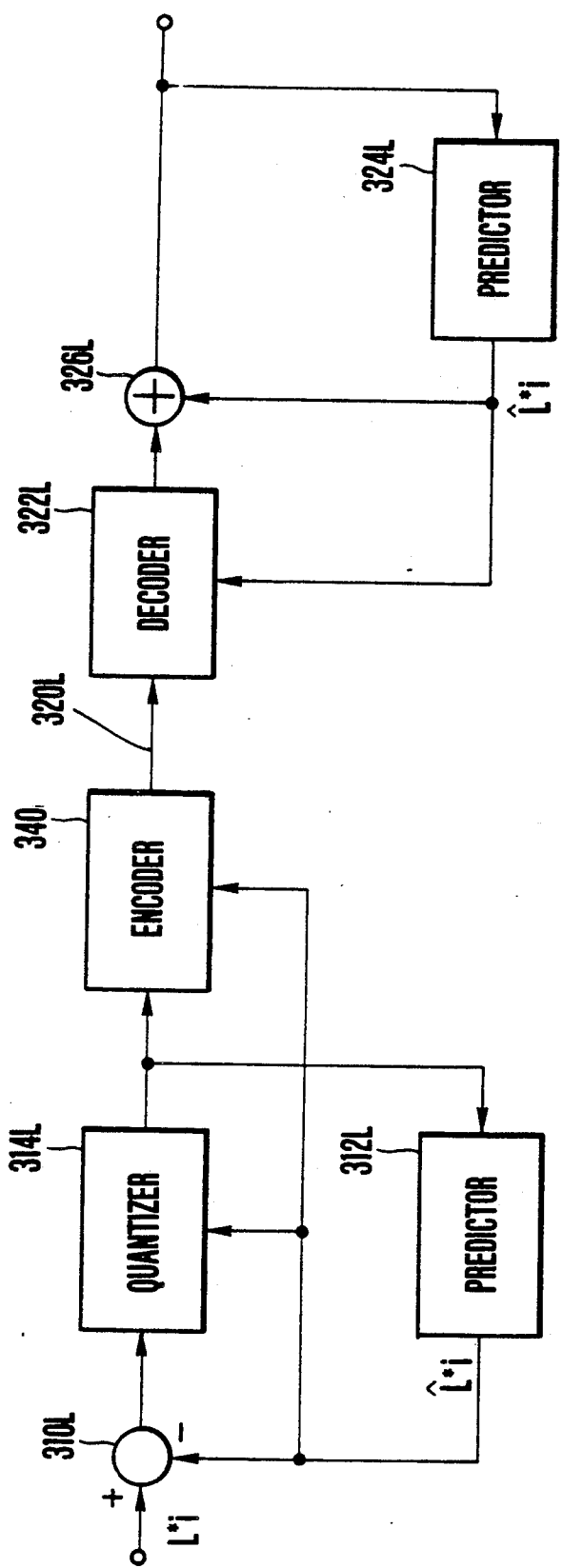

FIG. 22 is a block diagram showing a signal transmitting and receiving circuit arrangement to which this invention is applied as a fourth embodiment thereof. FIG. 23 shows an example of differential encoding arrangement for $L^*$. FIG. 24 is a circuit diagram showing by way of example the arrangement of a predictor shown on the transmitting side of FIG. 22. FIG. 25 shows an example of differential encoding arrangement for $a^*$ and $b^*$. FIGS. 26(A) and 26(B) show by way of example code allotment to be made in cases where a code is arranged to be allotted according to the size of a preceding value. FIG. 27 is a circuit diagram showing by way of example the details of a differential encoder arranged to carry out the code allotment shown in FIG. 26. FIGS. 28(A) to 28(D) show the characteristic of perception limits for uniform noises. FIGS. 29(A) and 29(B) show examples of non-linear quantization characteristics. FIG. 30 shows the characteristic of quantization errors allowable to the differential value of $L^*$. FIG. 31 shows a designing method for obtaining a non-linear quantizing characteristic. FIG. 32 show a quantizing characteristic for $a^*$ and $b^*$.

DETAILED DESCRIPTION OF THE PREFERRED EMBODIMENTS

The details of this invention will be understood from the following description of embodiments thereof Let us first discuss the characteristic of the visual sensation or perception of man for colorimetric systems. In quantizing image data, it is important to see how the visual sensational characteristic is affected by the noise resulting from quantization. The term "quantization" means a process of having values within the certain range of values represented by specific one of them and having a continuing extent of the value dispersed. The width of this dispersion or the minimum unit of thereof is called a quantization noise (or error). The quantization noise can be regarded as a uniform random noise. The influence of the quantization noise over the visual perception characteristic of man, therefore, can be found by adding beforehand a uniform random noise of a limited amplitude to a parameter of a colorimetric system and by examining the perception limit for that amplitude. This arrangement enables knowledge of an allowable limit of the quantization error for each of colors.

Figure 3:
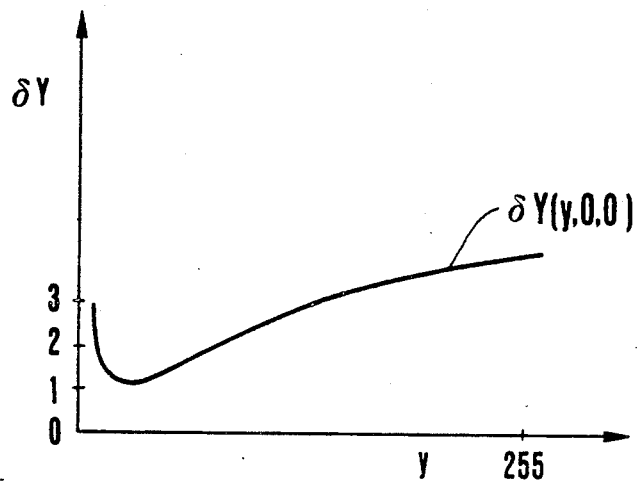
FIG. 3 shows the characteristic of the visual sensation of man as to a quantization error perception limit $\delta Y$ for a luminance signal Y when color components ry and by are at a zero level.

For example, with a color set within a space of Y·R-Y·B-Y, the components of the color are assumed to be y, ry and by. A uniform random noise of a maximum amplitude ay is added to the component y to obtain color components y+ay, ry and by. Then, the noise is examined as to whether it is perceptible by human sight. The perception limit thus found is assumed to be $\delta y$. The result of this examination enables us to know an imperceptible limit $\delta y$ which is not perceptible as an error relative to a signal Y for colors y, ry and by. Other perception limits $\delta RY$ and $\delta BY$ can be likewise found for signals R-Y and B-Y. These values $\delta Y$, $\delta RY$ and $\delta BY$ form a scalar field in the space of Y·R-Y·B-Y. In other words, the value $\delta Y$ depends on the colors y, ry and by. In the event of ry=0 and by=0, the value $\delta Y$ becomes as shown in FIG. 3. When the color y is at a large value (representing a bright image), the value $\delta Y$ is large and the noise is not readily perceptible in that event.

Figure 4:
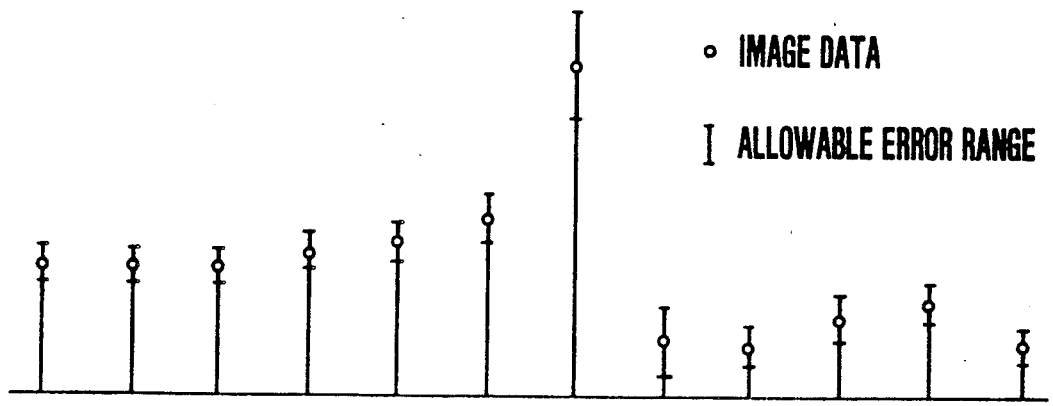
FIG. 4 qualitatively shows an image signal in relation to an allowable quantization error.

Further, the visual sensation of man is also characterized by a masking phenomenon which prevents visual perception of the occurrence of an amplitude error in image data in a saliently changing part of the image. In other words, the allowable error level varies and differs between a saliently changing part and a steady part of the signal. At a part where the signal intensity suddenly and saliently changes, a relatively large error may be allowed. FIG. 4 qualitatively shows this. In FIG. 4, the spatial or temporal position of an image is indicated on the axis of abscissa and the signal intensity on the axis of ordinate. The ceiling of the allowable quantization error in the level part of FIG. 4 corresponds to the above stated perception limit for the uniform random noise.

The characteristic of the visual sensation shows that: In cases where a difference from a preceding picture element is to be quantized by preceding-value predictive DPCM (the same applies also to ensuing-value prediction), the human sight is incapable of perceiving a relatively large quantization error in the part having a salient change or a large differential value. This, therefore, permits adoption of a non-linear quantizing process which is arranged to allow the range of quantization to be broadened at a part having a large differential value.

Figure 5:
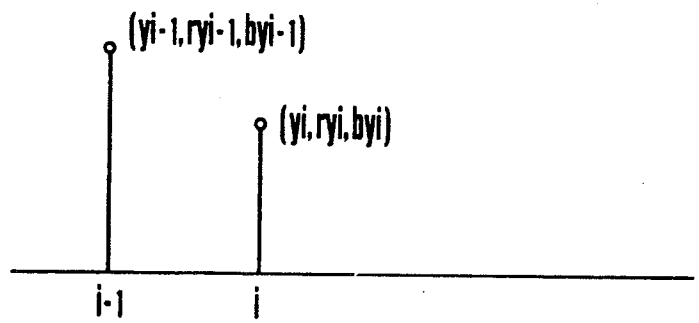
FIG. 5 shows color components obtained at consecutive time points i-1 and i.
Figure 6:
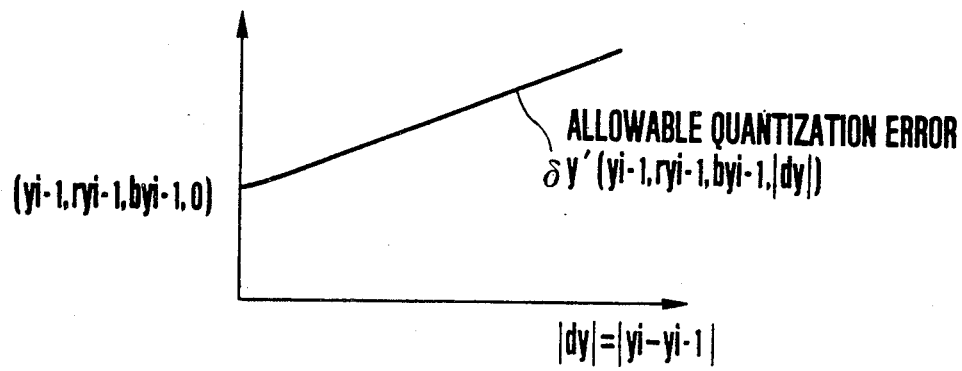
FIG. 6 shows an allowable quantization error characteristic for the differential value of the signal Y.
Figure 8A:
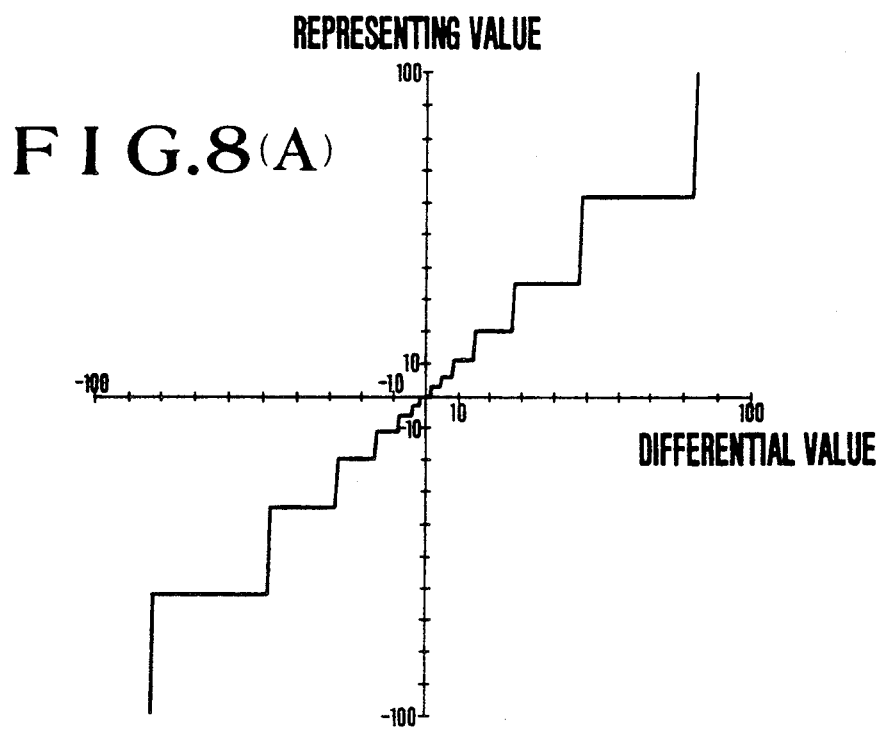
FIGS. 8(A) to 9(B)
Figure 8B:
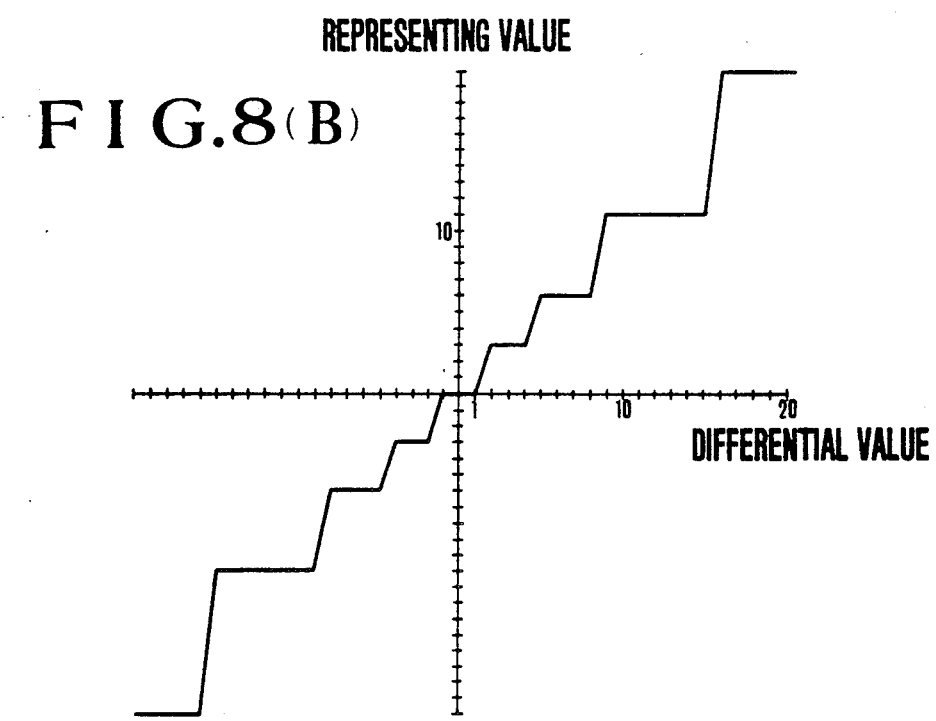
Figure 9A:
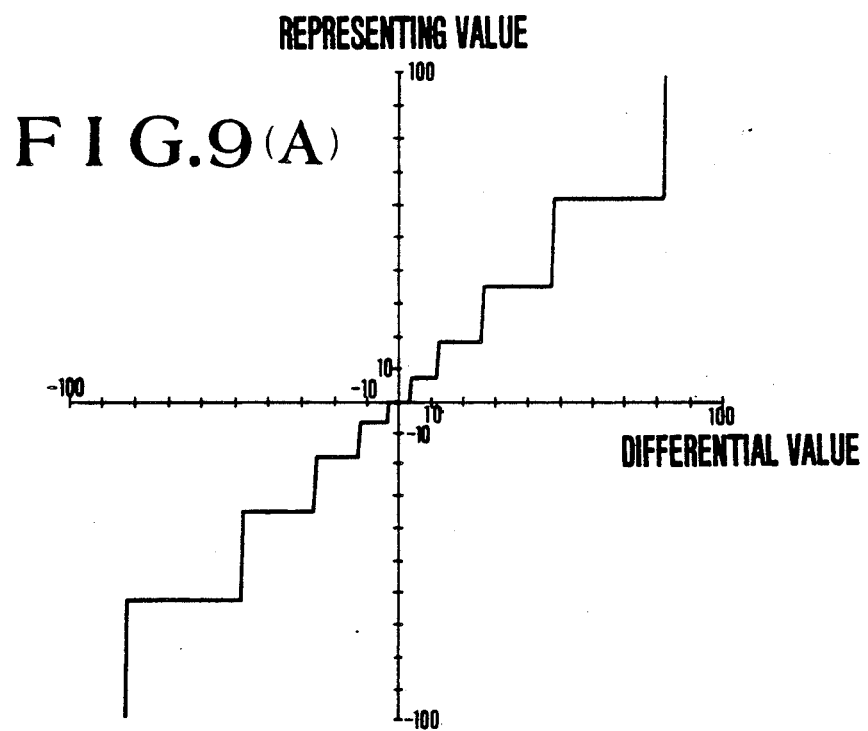
Figure 9B:
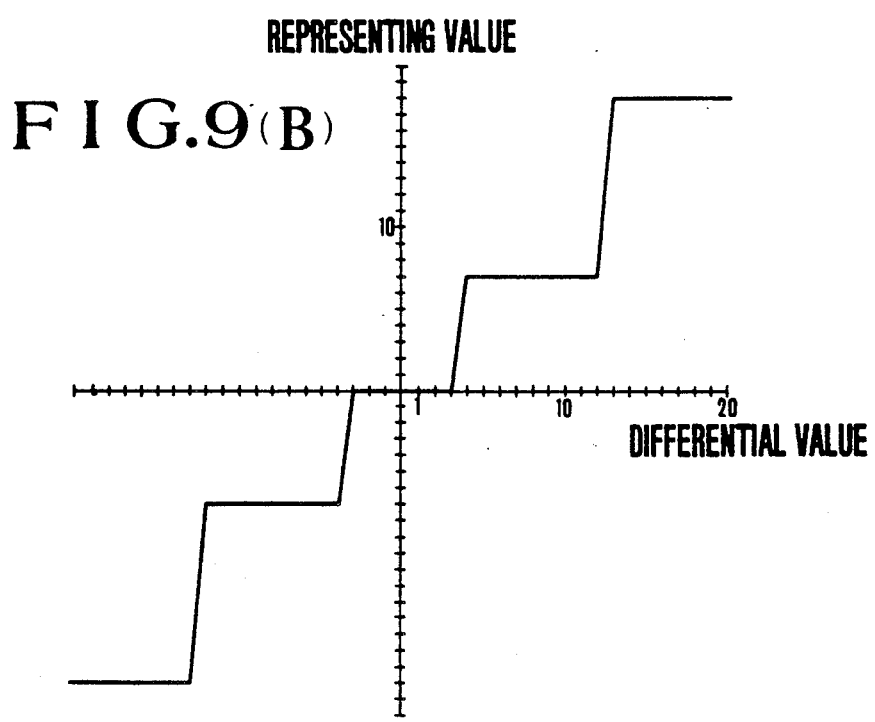

FIG. 5 shows a case where a color signal ($y_{i-1}$, $ry_{i-1}$, $by_{i-1}$) obtained at a point of time i-l changes to a color signal ($y_i$, $ry_i$, $by_i$) at another time point i. In this case, in quantizing a differential value ($y_i - y_{i-1}$), the allowable quantization error can be expressed by the absolute value $|dy| = |y_i - y_{i-1}|$ of a difference from the signal ($y_{i-1}$, $ry_{i-1}$, $by_{i-1}$) as shown in FIG. 6. The allowable error increases according as this absolute value increases. The value $\delta y'$ of FIGS. 6 and 7 can be examined by adding the uniform random noise to the image data having the differential value $|dy|$. The value $\delta y'$ ($y_{i-1}$, $ry_{i-1}$, $by_{i-1}$, 0) which is obtained at $|dy|=0$ represents the value $\delta y$ mentioned in the foregoing. Therefore, as shown in FIG. 7, the optimum non-linear quantizing characteristic is obtainable by drawing a bent line alternately between an allowable quantization error curve δy′ and the axis of abscissa of the drawing to intersect the axis of abscissa at an angle of 45 degrees and is determined by the points of intersection between the bent line and the allowable quantization error curve. A device designed according to this method of obtaining a non-linear quantizing characteristic has a quantizing characteristic which is, for example, as shown in FIG. 8(A) or FIG. 9(A). FIGS. 8(B) and 9(B) are enlarged views showing parts around the zero points of FIGS. 8(A) and 9(A) respectively.

With the allowable quantization error considered for each of the colorimetric parameters in the above stated manner, the data compressing rate can be increased as the picture quality deterioration due to the quantization error is not perceivable by the human sight and the quantization is allowed to be carried out to a minimum necessary degree.

Figure 1:
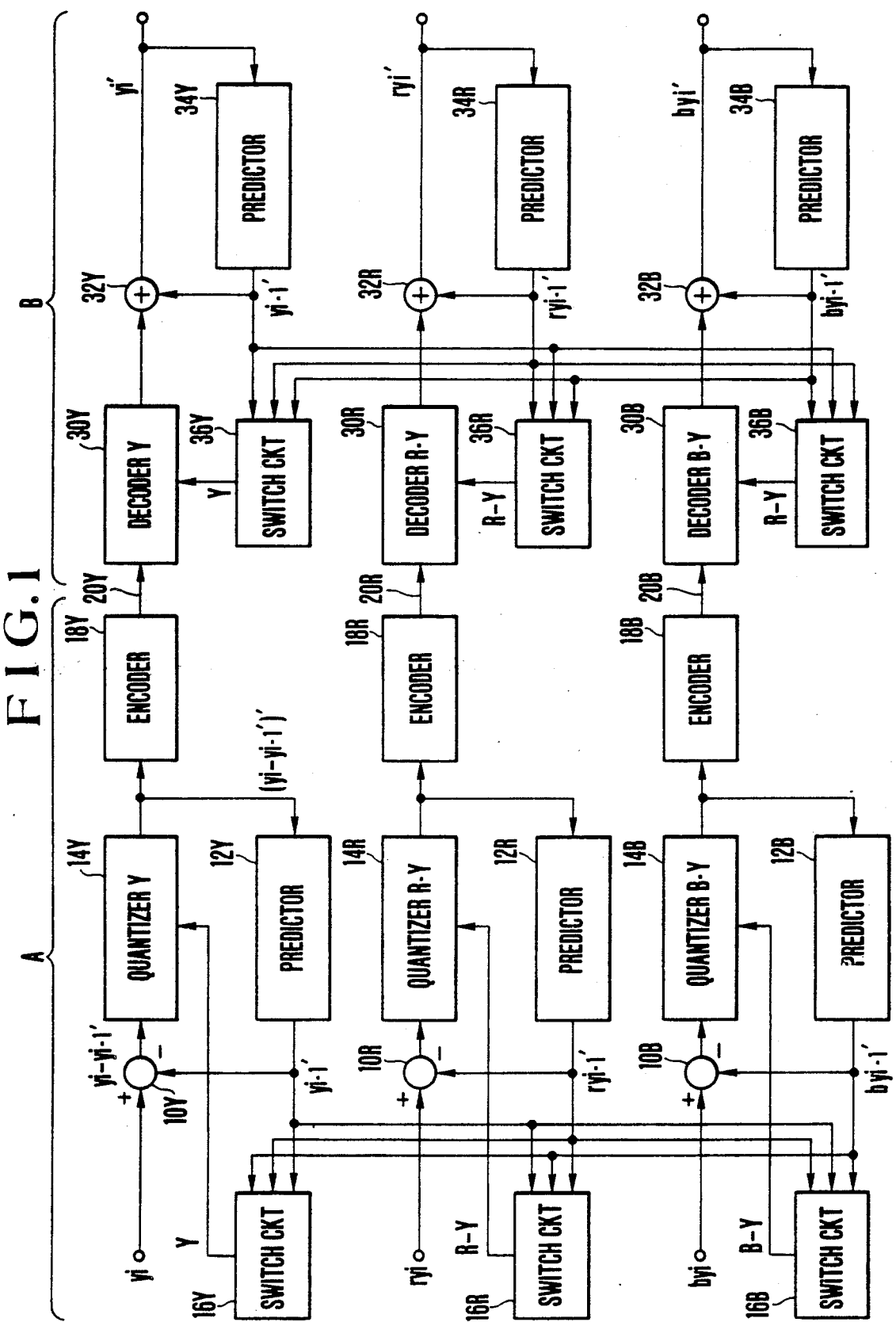
FIG. 1 is a block diagram showing a signal transmitting and receiving circuit arrangement to which this invention is applied as an embodiment thereof.

A circuit arrangement embodying this invention as a first embodiment thereof is arranged as described below with reference to the accompanying drawings:

A signal transmitting and receiving circuit arrangement to which this invention is applied as a first embodiment of this invention is as shown in FIG. 1. The following description of the first embodiment mainly covers the channel of a luminance signal Y. While reference numerals for the components of the signal Y channel have a suffix Y, reference numerals for those of channels of other signals R-Y and B-Y have suffixes R and B respectively instead of the suffix Y. The circuit arrangement includes a signal transmission system A and a signal receiving system B. In the signal transmission system A, an adding and subtracting element 10Y is arranged to compute a difference between a sampled signal yi and a predictive value yi-1′ which is a quantized value of a preceding picture element and is produced from a predictor 12Y. A quantizer 14Y is arranged to quantize a difference value yi - yi-1′ produced from the adding and subtracting element 10Y. A switch circuit 16Y is arranged to receive the predictive value yi-1′ from the predictor 12R, a predictive value ryi-1′ produced from a predictor 12R and a predictive value byi-1′ produced from a predictor 12B and to set a non-linear quantizing characteristic according to the above stated value δy′ at the quantizer 14Y. An encoder 18Y is arranged to make a quantized signal which is a representing value and is produced from the quantizer 14Y into a binary coded signal. For example, a code of a short bit length is allotted to the representing value if it frequently appears and a long (bit length) code to the representing value if it less frequently appears.

Other switch circuits 16R and 16B are arranged to receive the predictive value yi-1′ of the predictor 12Y, the predictive value ryi-1′ of the predictor 12R and the predictive value byi-1′ of the predictor 12B and to set non-linear quantizing characteristics according to the above stated values δRY′ and δBY′ respectively at quantizers 14R and 14B.

Figure 2:
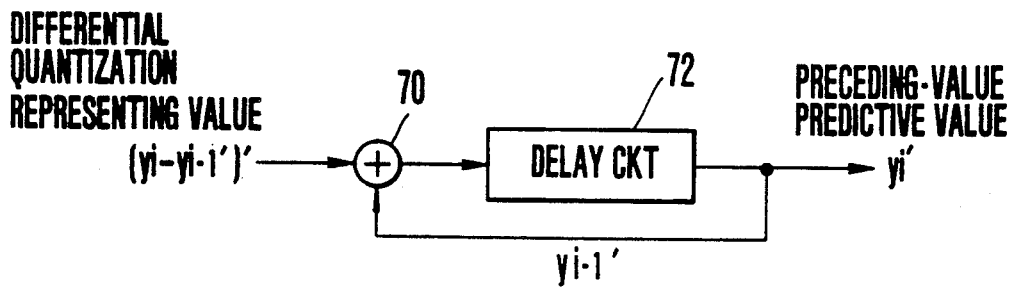
FIG. 2 is a diagram showing by way of example the arrangement of a predictor included in FIG. 1.

The representing value which is produced from the quantizer 14Y is applied also to the predictor 12Y to be used for prediction for a next picture element. A generic circuit arrangement of each of the predictors 12Y, 12R and 12B is as shown in FIG. 2. Referring to FIG. 2, a differential quantization representing value is brought back into its original value with the predictive value yi-1′ added thereto by an adder 70. The output of the adder 70 is delayed by a length of time corresponding to one picture element by means of a delay circuit 72. The output of the delay circuit 72 becomes a preceding-value predictive signal yi′. The output of the delay circuit 72 is applied also to the adder 70 to be used for the restoration of the differential signal.

The DPCM outputs of the encoders 18Y, 18R and 18B are supplied via transmission lines 20Y, 20R and 20B to the signal receiving system B. In the signal receiving system B, decoders 30Y, 30R and 30B decode the DPCM signals received via the transmission lines 20Y, 20R and 20B. The decoded signals are supplied to adders 32Y, 32R and 32B. Predictors 34y, 34R and 34B are arranged similarly to the predictors 12Y, 12R and 12B of the signal transmission system A to produce predictive values yi-1′, ryi-1′ and byi-1′. These predictive values are added to the outputs of the decoder 30Y, 30R and 30B by adders 32Y, 32R and 32B. The outputs of the adders 32Y, 32R and 32B are applied also to the predictors 34Y, 34R and 34B respectively to be used for signal restoration to be carried out at the adders 32Y, 32R and 32B.

The signal receiving system B includes switch circuits 36Y, 36R and 36B which are identical with the switch circuits 16Y, 16R and 16B of the signal transmission system A. The decoding characteristics of the decoders 30Y, 30R and 30B are selectively set to be corresponding to the quantizing and encoding characteristics of the transmission system A. The switch circuits 36Y, 36R and 36B are arranged to receive the predictive value yi-1′ of the predictor 34Y, the predictive value ryi-1′ of the predictor 34R and the predictive value byi-1′ of the predictor 34B and to have the characteristics of the decoders 30Y, 30R and 30B set according to the above stated values δY′, δRY′ and δBY′ respectively.

The preceding-value predictive value obtained by the signal receiving system B is the same as the value obtained by the transmission system A. Therefore, signal restoration can be perfectly carried out by the algorithm of the signal receiving system B.

The signals Y, R-Y and B-Y are encoded and decoded by the same algorithm. However, since the allowable quantization error for each signal component differs from the allowable quantization error for other components as mentioned in the foregoing, the transmission characteristics of the quantizing characteristic switch circuits 16Y, 16R and 16B, those of the quantizers 14Y, 14R and 14B and those of the decoders 30Y, 30R and 30B naturally differ from each other.

While the signals Y, R-Y and B-Y are arranged to be transmitted through the different transmission lines in the first embodiment as described in the foregoing, in the practical arrangement of this embodiment, the signals Y, R-Y and B-Y are arranged into a serial signal form after completion of the encoding process and are transmitted in that form via a transmission line. Then, the serial signal thus transmitted is divided into three signals and decoded by the receiving system B.

While the embodiment described is arranged to handle the colorimetric system of Y·R-Y·B-Y, the arrangement of this embodiment is likewise applicable to other colorimetric systems. In case that a colorimetric system of R·G·B is to be handled, for example, the perception limits δR, δG and δB for uniform random noise are examined and found beforehand for the whole space of R·G·B in the same manner as described in the foregoing; and then the device is arranged to have the non-linear characteristics on the basis of the allowable quantization errors δR′, δG′ and δB′ for the differential values. Such a modification also gives the same advantageous effect as that of the embodiment described in the foregoing.

Further, in the first embodiment, the perception limits $\delta Y$, $\delta RY$ and $\delta BY$ depend on the parameters of the colors (y, ry, by). However, it has been discovered that perception limits are dependent most greatly on one parameter that relates to brightness or luminance among the three parameters. Namely, in a space consisting of luminance Y and colors R-Y and B-Y, the allowable quantization errors of the parameters are dependent to a greater degree on the value of the luminance Y than on those of the colors R-Y and B-Y as shown in FIGS. 11(A) to 11(C). FIGS. 11(A) to 11(C) show the minimum values of perception limits for uniform random noise in the whole range of color parameters (R-Y and B-Y). These illustrations indicate that errors below the curves shown are allowable in principle.

As mentioned in the foregoing, the visual sensation of man has a masking phenomenon which prevents prompt visual perception of the occurrence of an amplitude error of image data in a saliently changing part of an image. The allowable error level of a saliently changing part of the signal differs from that of other parts which are not much changing. In other words, a relatively large error is permissible for a signal part where signal intensity saliently changes.

It is apparent from the characteristic of the visual perception of man mentioned above that: In quantizing a difference from a preceding value according to the predictive process of encoding on the basis of a preceding value, it is possible to employ a non-linear quantization method of broadening the quantizing width for a part having a large differential value.

Figures 14A, 14B:
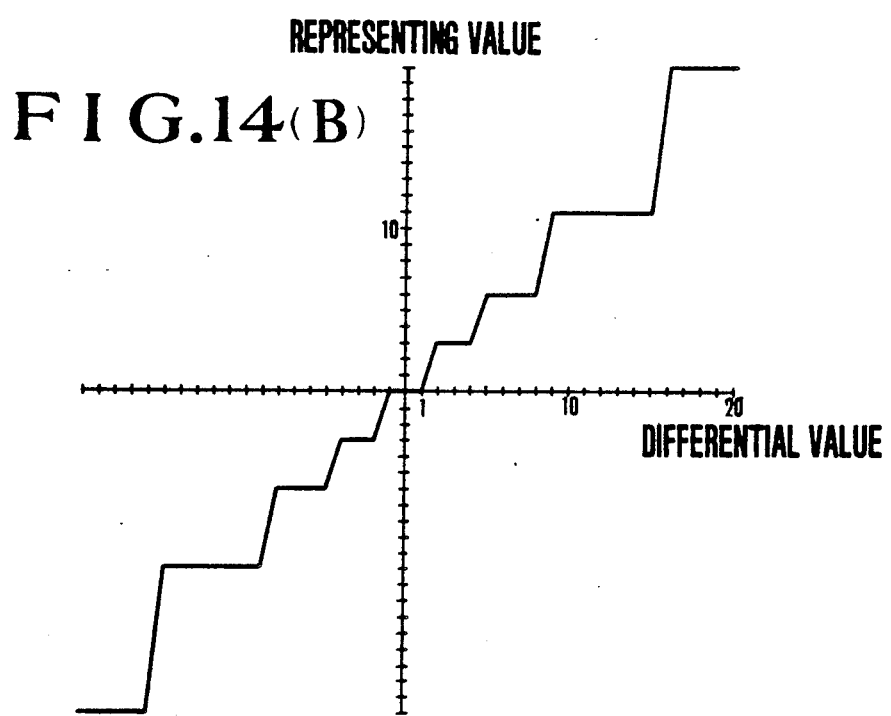
Figure 15A:
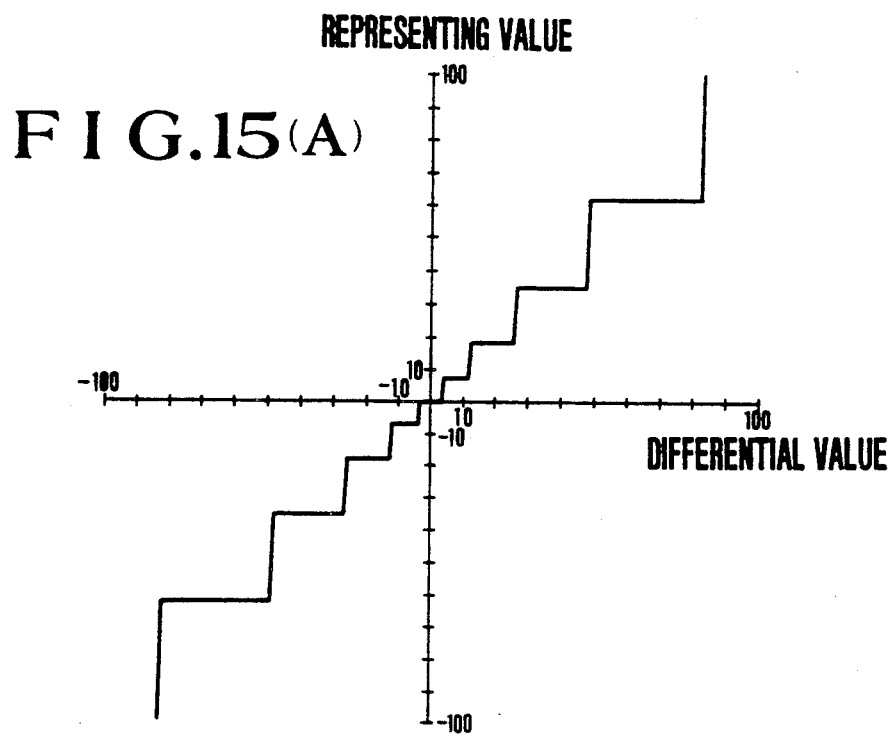
Figure 15B:
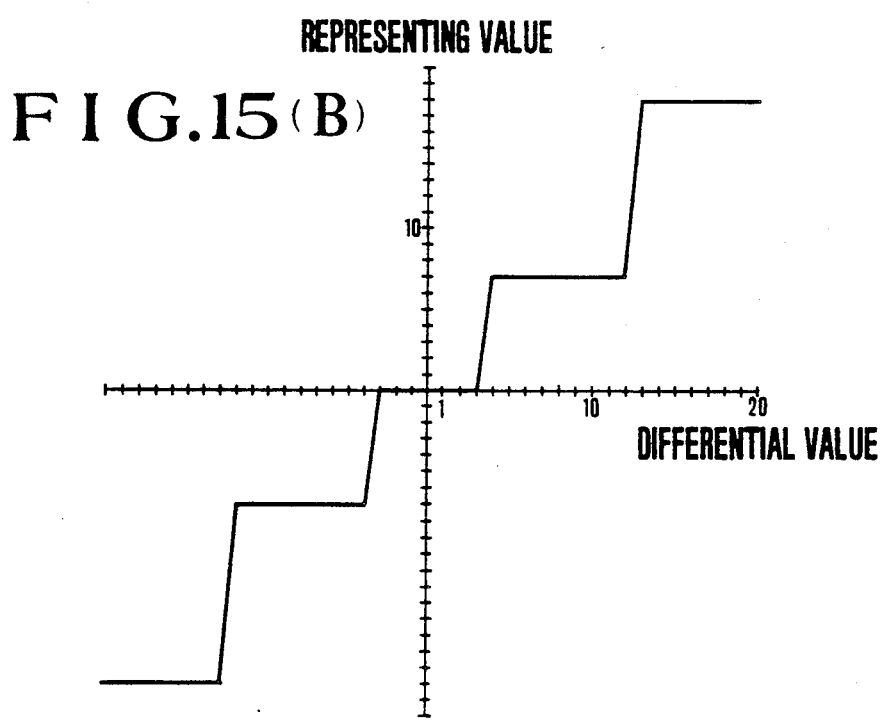

Referring to FIG. 12, let us assume that a color signal (yi-1, ryi-1 and byi-1) obtained at a time point i-1 changes to a color signal (yi, ryi, byi) at another time point i which continues from the time point i-1. Then, in quantizing a difference resulting from the change, the allowable quantization errors $\delta Y'$, $\delta RY'$ and $\delta BY'$ for the colorimetric parameters depend on the preceding value yi-1. Generally, the allowable errors increase accordingly as the absolute value of the difference increases as shown in FIGS. 13(A) to 13(C). The minimum values of the allowable quantization errors represent the above stated values $\delta Y$, $\delta RY$ and $\delta BY$ and are determined by the preceding value yi-1. The characteristic represented by FIGS. 13(A) to 13(C) are obtainable by examining allowable errors for the value yi-1 and the degrees of changes. As shown in FIGS. 13(A) to 13(C), the allowable quantization error is determined by the value yi-1 and the degree of change. Each of the non-linear quantizing characteristics based on the allowable quantization error curves of FIGS. 13(A) to 13(C) is obtainable, for example, by drawing a bent line alternately between an allowable quantization error curve and the axis of abscissa of the drawing to intersect the axis of abscissa at an angle of 45 degrees and is determined by the points of intersection between the bent line and the allowable quantization error curve. A device designed according to this method has a quantizing characteristic, for example, as shown in FIG. 14(A) or 15(A). FIGS. 14(B) and 15(B) are enlarged views showing parts around the zero points of FIGS. 14(A) and 15(A).

With the allowable quantization error considered for each of the colorimetric parameters in the above stated manner, the data compressing rate can be increased as the picture quality deterioration due to the quantization error is not perceivable by the human sight and the quantization is allowed to be carried out to a minimum necessary degree. For determining an allowable limit of quantization error for each individual color, the predictive values should be considered for all of the three colorimetric parameters in principle. In the case of this invention, however, the allowable quantization error for each colorimetric parameter is arranged to be determined on the basis of data relative to the luminance of the color. This permits simplification of circuit arrangement for determining the allowable error.

A circuit arrangement embodying this invention as a second embodiment thereof is arranged as described below with reference to the accompanying drawings:

FIG. 10 shows the signal transmission and receiving circuit systems of the second embodiment of this invention. The following description of the second embodiment mainly covers the channel of a luminance signal Y. While reference numerals used for the components of the signal Y processing channel have a suffix Y, reference numerals for those of channels of other signals R-Y and B-Y have suffixes R and B respectively instead of the suffix Y. In the signal transmission system A, an adding and subtracting element 110Y is arranged to compute a difference between a sampled signal value yi and a predictive value yi-1' which is a quantized value of a preceding picture element and is produced from a predictor 112Y. A quantizer 114Y is arranged to quantize a difference value yi - yi-1' produced from the adding and subtracting element 110Y. The quantizer 114Y is further arranged to set a non-linear quantizing characteristic on the basis of the predictive value yi-1' obtained from the predictor 112Y and to quantize the input signal accordingly. An encoder 116Y is arranged to convert a quantized signal, which is a representing value and is produced from the quantizer 114Y, into a binary coded signal. For example, a short code is allotted to the representing value if it frequently appears and a long code to the representing value if it less frequently appears.

A quantizer 114R is arranged to set a non-linear quantizing characteristic for the value $\delta RY'$ according to the predictive value yi-1' produced from the predictor 112Y and to quantize an input signal according to the set characteristic. Another quantizer 114B is arranged to set a non-linear quantizing characteristic for the value $\delta BY'$ according to the predictive value yi-1' of the predictor 112Y and to quantize an input signal accordingly.

The representing value produced from the quantizer 114Y is applied also to the predictor 112Y to be used for prediction for a next picture element. Each of the predictors 114Y, 114R and 114B generally consists of an adder which is arranged to add a preceding value to a differential quantization representing value and a delay circuit which is arranged to delay the output of the adder to a degree corresponding to one picture element. The output of this delay circuit is the output of the predictor. The output of the delay circuit is further arranged to be applied to the adder as a preceding value to be used for restoration of the differential signal.

The DPCM output of the encoders 116Y, 116R and 116B are supplied via transmission lines 120Y, 120R and 120B to the signal receiving system B. In the signal receiving system B, decoders 130Y, 130R and 130B are arranged to decode the DPCM signals received via the transmission lines 120Y and 120R and 120B. The decoded signals are supplied to adders 132Y, 132R and 132B. These adders 132Y, 132R and 132B are arranged to add to the outputs of decoders 130Y, 130R and 130B predictive values yi-1', ryi-1' and byi-1' coming from predictors 134Y, 134R and 134B which are arranged similarly to the predictors 112Y, 112R and 112B of the signal transmission system A. As a result, the adders 132Y, 132R and 132B produce color component signals yi', ryi' and byi' respectively. These outputs of the adders 132Y, 132R and 132B are respectively applied to the predictors 134Y, 134R and 134B to be used for signal restoration to be effected at the adders 132Y, 132R and 132B.

The decoding characteristics of the decoders 130Y, 130R and 130B of the signal receiving system B are selectively set, according to the output yi-1' of the predictor 134Y, to be corresponding to the quantizing and encoding characteristics of the transmission system A.

The predictive value which is obtained on the basis of a preceding value by the signal receiving system B is the same as the value obtained by the signal transmission system A. Therefore, signal restoration can be perfectly carried out by the algorithm of the system B.

The signals Y, R-Y and B-Y are encoded and decoded by the same algorithm. However, since the allowable quantization error for each signal component differs from the allowable quantization errors for other components as mentioned in the foregoing, the transmission characteristics of the quantizers 114Y, 114R and 114B and those of the decoders 130Y, 130R and 130B naturally differ from each other.

In the second embodiment described above, the signals Y, R-Y and B-Y are arranged to be transmitted through different transmission lines. In the practical arrangement of the embodiment, the signals Y, R-Y and B-Y are converted into a serial signal form after completion of the encoding process and are transmitted in that form via a transmission line to a signal receiving system B. The receiving system B then divides the transmitted signal into three signals and decodes them. In that instance, since the embodiment requires information on luminance for decoding, the signal Y is processed before other signals R-Y and B-Y are processed.

While the second embodiment is arranged as described in the foregoing to handle the colorimetric system of Y R-Y B-Y, the arrangement of this embodiment is likewise applicable to other colorimetric systems. In case that colorimetric systems of YIQ, La*b* and Lu*v* are to be handled, for example, the optimum quantizing characteristic can be set by using a predictive value of Y or L because both the values Y and L represent lightness or luminance. Further, in the event of an RGB system, the advantage of the arrangement of this embodiment is also attainable by using a predictive value of the signal G, which proximately represents lightness in the RGB system.

A third embodiment of this invention is arranged as follows: In this case, the quantizing characteristic is selected by determining the allowable quantization error with reference to the lightness indicating component value of a preceding picture element. As to the color indicating signal component, the quantizing characteristic is selected by determining the allowable quantization error with the lightness indicating component value of the present picture element also taken into consideration. The arrangement to handle the color indicating signal component in this manner enables the encoding process to be carried out at a good data compressing rate with characteristic of the visual sensation or perception of man duly taken into consideration. The embodiment, therefore, does not deteriorate the image.

FIG. 16 shows by way of example a circuit arrangement embodying this invention as the third embodiment thereof. The circuit arrangement includes a signal transmission system A and a signal receiving system B. The third embodiment necessitates making reference to the luminance signal Y which indicates the luminance of the present picture element in quantizing the chrominance signal components. Therefore, in the case of FIG. 16, color difference signals R-Y and B-Y are sampled at a time point i while the luminance signal Y is sampled at another time point i+1. The following description mainly covers a processing channel for the luminance signal Y. While reference numerals for the components of the signal Y processing channel have a suffix Y, reference numerals for those of channels for other signals R-Y and B-Y have suffixes R and B in place of the suffix Y. A mark ' is suffixed to quantized values for the purpose of discriminating them from true values.

In the signal transmission system A, an adding and subtracting element 210Y is arranged to compute a difference between a sampled signal value yi+1 and quantized value yi' which is obtained from a preceding picture element and is supplied from a predictor 212Y as a predictive value. A quantizer 214Y quantizes a differential value yi+1−yi' produced from the adding and subtracting element 210Y. The quantizer 214Y is arranged to receive the predictive value yi' from the predictor 212Y and to quantize the input signal with a non-linear quantizing characteristic which is based on an applicable allowable quantization error. An encoder 216Y converts a quantized signal yi+1' which is of a representing value and is produced from the quantizer 214Y into a binary coded signal. The encoder 216Y is arranged, for example, to allot a short code to the representing value if it frequently appears and a long code if it does not frequently appears. A quantizing characteristic switching circuit 218 is arranged to receive the output yi' of the predictor 212Y and a representing value yi−1' produced from a delay circuit 219 which delays its input to a degree corresponding to one picture element. Upon receipt of these inputs, the switching circuit 218 instructs a quantizer 214R for the signal R-Y and another quantizer 214B for the signal B-Y to select and set them at the optimum quantizing characteristics respectively. In other words, they are caused to select such non-linear quantizing characteristics that the quantization is more coarsely made, within the imperceptible limit of the quantization error, accordingly as the value yi' increases, i.e. accordingly as the difference between the values yi-1' and yi' increases. This arrangement advantageously reduces the number of the differential representing values and increases a short code allotting rate.

The quantizer 214R supplies an encoder 216R and a predictor 212R with a quantized signal obtained at a time point i from the signal R-Y. The quantizer 214B supplies an encoder 216B and a predictor 212B with a quantized signal obtained at the time point i from the signal B-Y.

Each of the predictors 212Y, 212R and 212B generally includes an adder which is arranged to add a preceding picture element value to the differential quantization representing value; and a delay circuit which is arranged to delay the output of the adder to a degree corresponding to one picture element. The output of the delay circuit becomes the output of the predictor. The output of the delay circuit is applied also to the adder to be used for restoring the incoming differential signal.

The DPCM outputs of the encoders 216Y, 216R and 216B are supplied via transmission lines 220Y, 220R and 220B to the signal receiving system B. In the signal receiving system B, decoders 230Y, 230R and 230B are arranged to decode the DPCM signals coming via the transmission lines 220Y, 220R and 220B. The decoded signals are supplied to adders 232Y, 232R and 232B. The adders 232Y, 232R and 232B are arranged to add, to the outputs of the decoders 230Y, 230R and 230B, the predictive values yi', ryi-l' and byi-i' produced from predictors 234Y, 234R and 234B which are arranged similarly to the predictors 212Y, 212R and 212B of the signal transmission system A. As a result of addition, the adders 232Y, 232R and 232B produce color component signals yi+1', ryi' and byi'. The outputs of the adders 232Y, 232R and 232B are also applied to the corresponding predictors 234Y, 234R and 234B to be used for signal restoration at these adders.

The decoder 230Y of the signal receiving system B is arranged to be selectively set according to the output yi' of the predictor 234Y at a decoding characteristic which corresponds to the quantizing and encoding characteristics of the signal transmission system A. A decoding characteristic switching circuit 240 is arranged to receive the predictive value yi' of the predictor 234Y and the output yi-l' of a delay circuit 242 which is delayed to a degree corresponding to one picture element and to cause the decoder 230R of the signal R-Y and the decoder 230B of the signal B-Y to be set at such decoding characteristics that corresponds to the quantizing and encoding characteristics of the transmission system A.

The predictive value obtained from a preceding value by the signal receiving system B is the same as the predictive value obtained by the transmission system A. Therefore, signal restoration can be perfectly carried out by the algorithm of the system B. The signals Y, R-Y and B-Y are encoded and decoded by the same algorithm. However, since the allowable quantization error for each signal component differs from the allowable quantization errors for other components, the transmitting characteristics of the quantizers 214Y, 214R and 214B and those of the decoders 230Y, 230R and 230B naturally differ from each other.

Figure 20A:
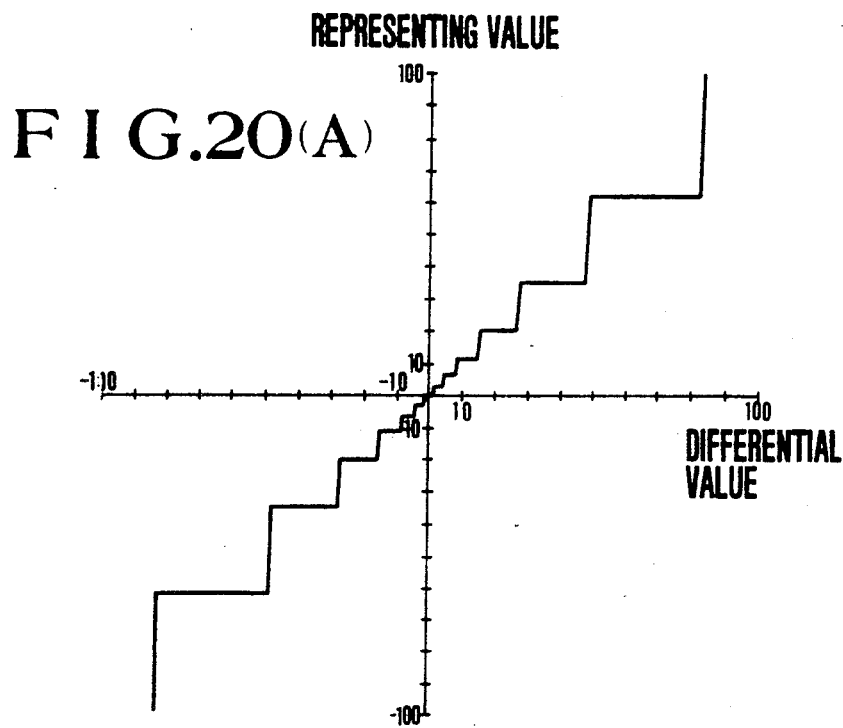
Figure 20B:
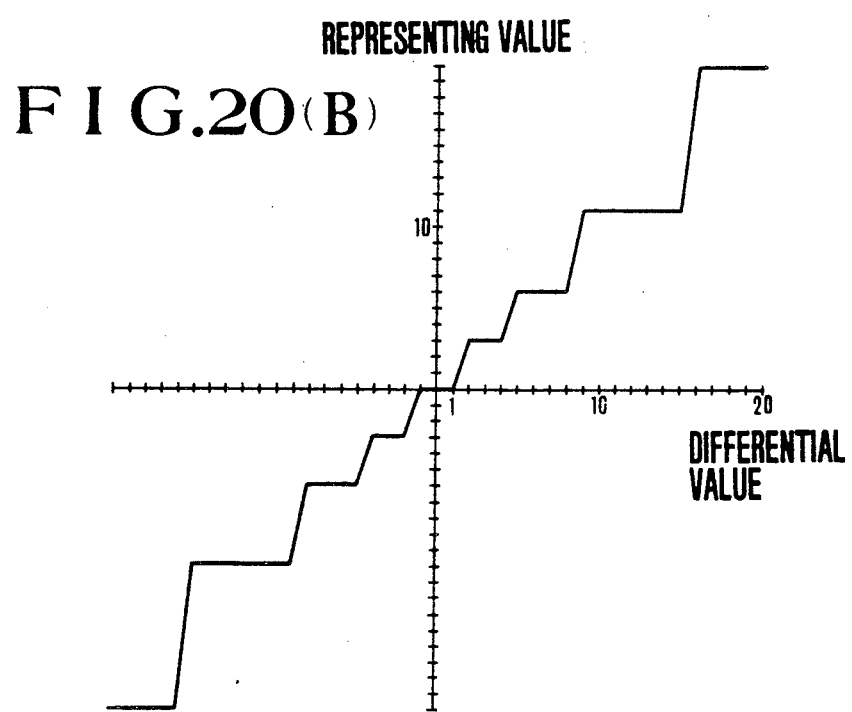
Figure 21A:
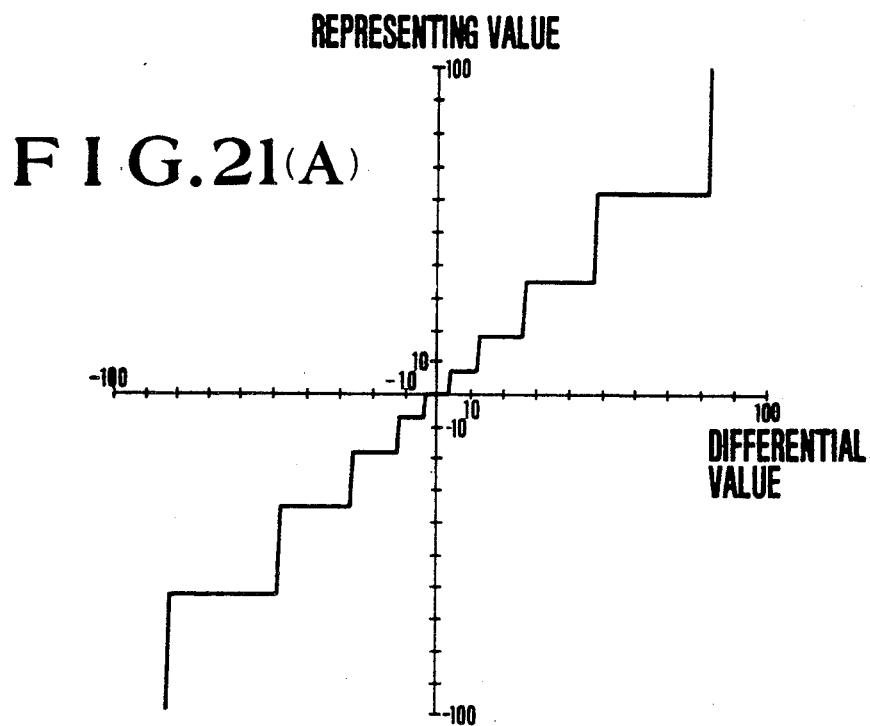
Figure 21B:
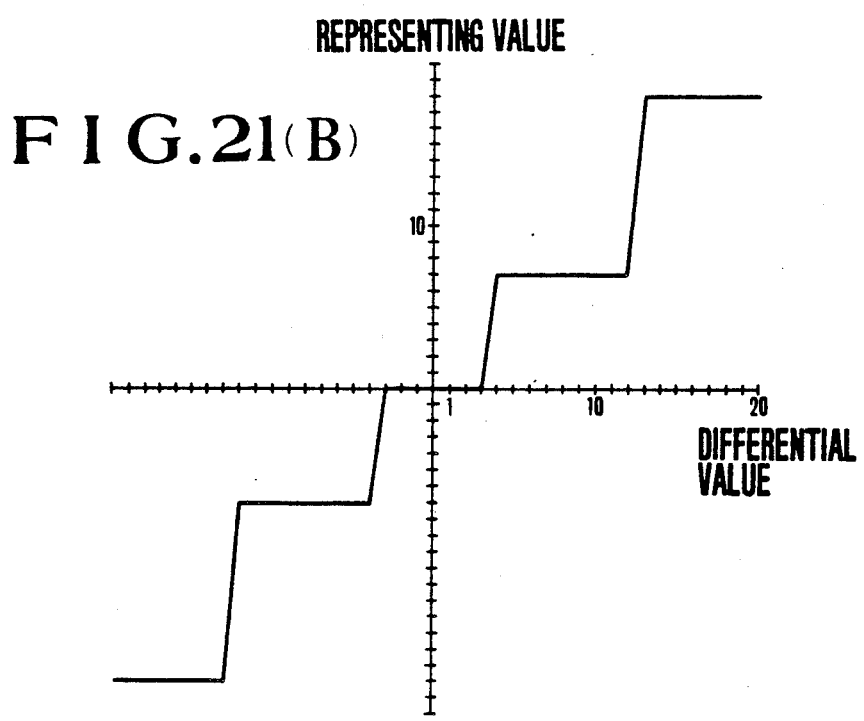

Let us assume that the value yi-l of the signal Y obtained at the sampling point i-l is relatively small while the value yi of the signal Y obtained at another sampling point i is relatively large. In this case, in accordance with the method of determining the allowable quantization errors for the signal components (parameters) on the basis of the luminance signal value yi-l' f a preceding picture element, a fine non-linear quantizing characteristic utilizing the masking phenomenon mentioned in the foregoing as shown in FIG. 20(A) is selected in obtaining the differences of the signal values yi, ryi and byi obtained at the sampling point i and carrying out quantization for all the signals Y, R-Y and B-Y. However, in the event of a large degree of a change in luminance from a preceding picture element, unusually large quantization errors come to be allowed for the signals pertaining to the color. In that event, therefore, the data compressing efficiency lowers for the signals R-Y and B-Y. Whereas, in the case of this embodiment, the data compressing efficiency is enhanced by selecting a coarse quantizing characteristic as shown in FIG. 21(A) with the luminance signal value of the present picture element also used for reference. FIGS. 20(B) and 21(B) are enlarged view showing parts around the zero points of FIGS. 20(A) and 21(A).

In case that the bandwidths of the signals R-Y and B-Y are limited as in the case of a signal of the NTSC system, the signals R-Y and B-Y may be sampled at a frequency which is for example $\frac{1}{2}$ or $\frac{1}{4}$ of the sampling frequency of the signal Y. FIG. 17 shows the positions of samples obtained at the $\frac{1}{2}$ sampling frequency. Under such a condition, according to the method of determining the quantizing characteristic with reference to the luminance signal of a preceding picture element, the quantizing characteristics for the values ryi and byi sampled at the sampling point i are set for quantizing differences from sampled values ryi-2 and byi-2 obtained at another sampling point i-2 on the basis of a luminance signal sample value yi-2' obtained at the sampling point i-2. In that case, the signal Y has a low degree of correlation because of its sampled point which is away from the present point by two picture elements. The method of determining the quantizing characteristic by using the value yi-2', is, therefore, inappropriate in this case.

In applying this invention to the above stated case, the values of the signal Y obtained at the sampling points i-2 and i are used for solving the problem. FIG. 18 shows by way of example a circuit arrangement which solves the above stated problem. In the case of FIG. 18, the signal sample y is processed ahead of signal samples ry and by at the timing preceding them by two picture elements because: It is necessary to use the signal values y' obtained at the sampling points i and i-2 for processing the signals ry and by sampled at the sampling point i. In FIG. 18, the same circuit elements as those of FIG. 16 are indicated by the same reference numerals.

In the case of FIG. 18, the predictor 242Y which is disposed in the signal transmission system A for the signal Y is arranged to produce a predictive value yi' preceding the present time point by two picture elements for a signal Y input yi+2 coming to the signal transmission system A. The counterpart predictor 244Y which is disposed within the signal receiving part B also produces the predictive value yi' preceding the present time point by two picture elements. A quantizing characteristic switching circuit 246 which is disposed in the signal transmission system A and corresponds to the quantizing characteristic switching circuit 218 is arranged to receive the output yi' of the predictor 242Y of the system A and a quantized value yi-2' which has been delayed by delay circuits 248 and 250 to precede the output yi' by two picture elements. The circuit 246 then supplies a change-over signal to quantizers 214R and 214B. A decoding characteristic switching circuit 252 which is disposed within the signal receiving system B and corresponds to the circuit 240 of FIG. 16 is arranged to receive the output yi' of the predictor 244Y of the signal receiving system B and the quantized value yi-2' which has been delayed by delay circuits 254 and 256 to precede the output yi' by two picture elements. The switch circuit 252 then supplies a change-over signal to decoders 230R and 230B.

In case that a quantized value of an immediately preceding picture element is to be employed as a predictive value for the signal Y as in the case of FIG. 16, the output yi+1' of the predictor 242Y is delayed by a delay circuit to a degree corresponding to one picture element.

In the case of the circuit of FIG. 18, the signals R-Y and B-Y become input signals ryj and byj (the relation of "j" to "i" is as shown in FIG. 17). Then, a difference from a preceding value obtained at a sampling point j-1 is encoded by both the signal transmission and receiving systems A and B.

For obtaining a finer quantizing characteristic, the quantized value yi-1' may be also supplied to the switching circuits 246 and 252 from the delay circuit 248 as shown in FIG. 19. In the case of FIG. 18, if the value yi' is about the same as the value yi-2', a finely divided quantizing characteristic is set according to the value yi-2' and a differential value obtained therefrom irrespectively of the value yi-1'. In case that the value yi-1' is very small having a salient difference from the value yi', a coarse quantizing characteristic may be selected. In that case, it is preferable to make reference also to the value yi-1' as shown in FIG. 19. By virtue of the above stated arrangement, the method of this invention can be advantageously utilized even in cases where the signals R-Y and B-Y are arranged to be less frequently sampled than the signal Y.

The third embodiment is arranged to transmit the signals Y, R-Y and B-Y through discrete transmission lines. In a practical application, however, the embodiment is arrange to have the signals Y, R-Y and B-Y converted into a serial signal after encoding and then to have the serial signal divided into three by the signal receiving system B before decoding. Since information on luminance is required by the embodiment, the signals R-Y and B-Y may be arranged to be delayed by one picture element from the signal Y. Further, while the embodiment is arranged to process the signal Y ahead of other signals R-Y and B-Y to a degree corresponding to one or two picture elements for the purpose of processing the values ry and by. However, since it suffices to have the signal Y processed ahead of the signals R-Y and B-Y by one or two picture elements, the embodiment may be arranged to process one picture element portion of the signal Y ahead of other signals; to have the quantized data thus obtained temporarily stored at a buffer memory; and to process the signals R-Y and B-Y with reference to the contents of the buffer memory.

While the the embodiment is described in the foregoing to handle the colorimetric system of Y·R-Y·B-Y, the arrangement is likewise applicable to other colorimetric systems. In case that colorimetric systems of YIQ, La*b* and Lu*v* are to be handled, for example, the optimum quantizing characteristic can be set by using a predictive value of Y or L because both of them represent lightness. In the event of an RGB system, the advantage of the embodiment is also attainable by using a predictive value of the signal G which, in the RGB system, approximately represents lightness in place of the signal Y described in the foregoing and by processing the signals R and B in place of the signals R-Y and B-Y as described in the foregoing.

The allowable quantization error was examined with respect to the known CIELAB colorimetric system in the same manner as in the case of the first embodiment. The results are as follows: The chroma $C^*$ and the hue $H^*$ can be defined as known by the following formula (1):

$$C^* = (a^{*2} + b^{*2})^{\frac{1}{2}}$$

$$H^* = \tan^{-1}(b^*/a^*) \quad (1)$$

Figure 28A:
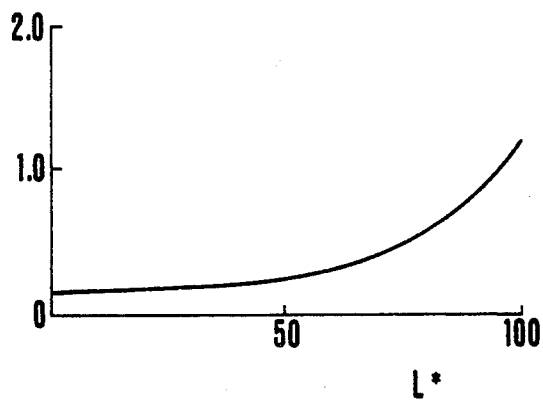
Figure 28B:
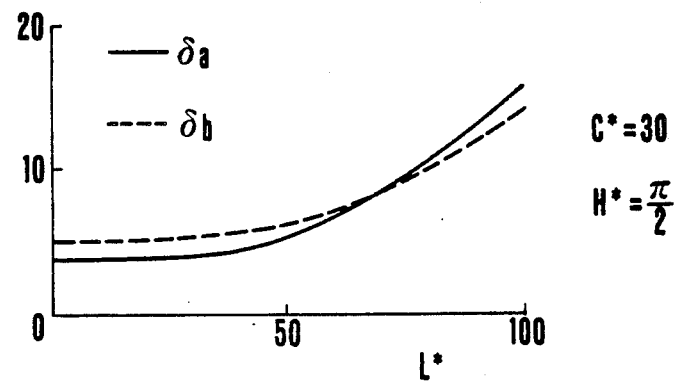
Figure 28C:
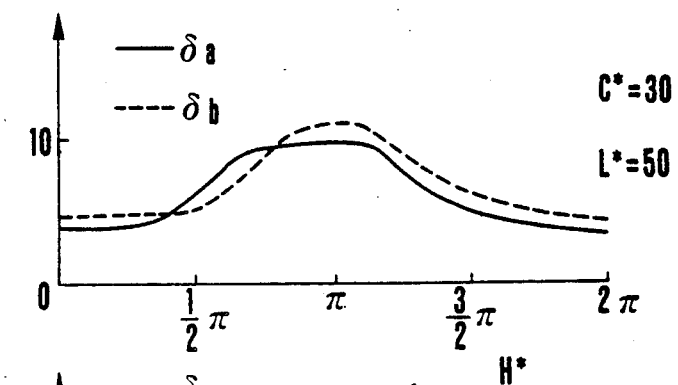
Figure 28D:
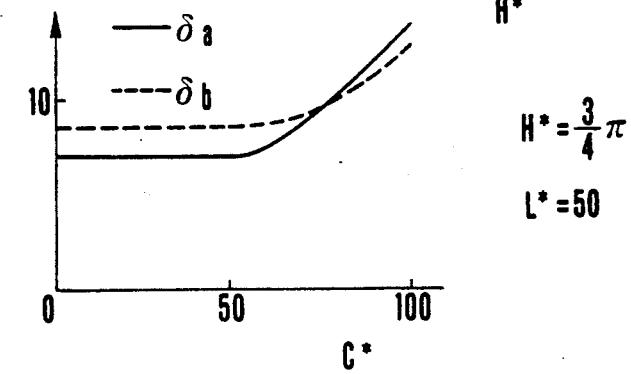

The perception limits for noise of $L^*$, $b^*$ and $a^*$ are assumed to be $\delta L$, $\delta a$ and $\delta b$ respectively. The value $\delta L$ is greatly dependent on the value of $L^*$ but not on the values of $C^*$ and $H^*$ as shown in FIG. 28(A). Therefore, the value $L^*$ can be quantized solely in regard of $L^*$ without any regard to $a^*$ and $b^*$. Meanwhile, the values $\delta a$ and $\delta b$ are, for example, as shown in FIGS. 28(B) to 28(D). They much depend on the values of $L^*$, $C^*$ and $H^*$. Therefore, quantization of $a^*$ and $b^*$ should be adaptively carried out according to the spatial position of $L^*$, $a^*$ and $b^*$. In quantizing image data, the values $\delta L$, $\delta a$ and $\delta b$ serve as references.

In accordance with the DPCM method of predicting by a preceding value, each picture element signal is quantized after its difference from the signal of a preceding picture element is obtained. However, at a greatly changing part of an image, i.e. at a part where a difference between picture elements is large, the quantization error becomes imperceptible by the human eye even if the error is large. Therefore, adoption of the non-linear quantizing method presents no problem in terms of the visual sensation of man.

The value $L^*$ is first described as follows: Adaptive quantization is performed with reference to the value $\delta L$ for the preceding value of $L^*$. More specifically, non-linear differential quantization is performed in such a manner that the representing value becomes zero when the differential value is in between $-\delta L$ and $+\delta L$. FIGS. 29(A) and 29(B) show quantizing characteristics obtained in cases where the preceding value of $L^*$ is 80 and 30. As apparent from FIGS. 29(A) and 29(B), the quantizing error range have the value $\delta L$ at the lower limit thereof at a part where the differential value is small showing a small change. At another part having a salient change, the quantization error range increases as compared with the value $\delta L$. Such a non-linear quantizing characteristic is obtainable with the device designed by examining actual images, under a condition where the picture element values are within a certain limited range, to find the allowable quantization errors in relation to the magnitudes of the differential values. For example, with the preceding picture element value between 80 and 100, the allowable quantization error in relation to the differential value is as shown in FIG. 30. Therefore, a quantizing characteristic which ensures no deterioration of images in terms of the visual sensation of man is obtainable by determining representative values and the representing range thereof as shown in FIG. 31.

The DPCM method for $a^*$ and $b^*$ is as follows: The uniform noise which is used in determining the values $\delta a$ and $\delta b$ includes frequencies up to a maximum frequency. In an actual image, however, no extremely high quantization noise arises with respect to $a^*$ and $b^*$. When the DPCM method is applied to an image which does not much change, the quantized image signal comes to take a saliently stepping shape. Then, the stepped part of the image signal comes to present a spurious contour in the visional senatation of man. As a result, the allowable quantization error for a moderately changing image becomes smaller than the actual values $\delta a$ and $\delta b$ for $a^*$ and $b^*$. To solve this problem, therefore, the adaptive differential quantization method for $a^*$ and $b^*$ is arranged to have the representing ranges, in which the differential representing value becomes zero, set to be from $-\delta a/2$ to $+\delta a/2$ and from $-\delta b/2$ to $+\delta b/2$ by making reference to the values $\delta a$ and $\delta b$ of a preceding picture element. With regard to $L^*$, since the value $\delta L$ is very small as compared with the difference value of the image, the degree of the masking effect of the non-linear quantization is easily conformable. As for a* and b*, however, since the values δa and δb are about the same as the differential value, it is difficult to make a discrimination between an allowable quantization error resulting from the making effect which causes a spatial change and the duly allowable quantization error in terms of visual perception for the color data. In view of this, the differential quantizing characteristic for a* and b* is arranged, according to the values δa and δb, to have a smaller allowable quantization error range for a moderately changing part and to have a larger allowable quantization error range than the values δa and δb for a saliently changing part. This arrangement is as shown in FIG. 32.

The embodiment described above is capable of reproducing colors in a state of appearing natural to the eye by virtue of the differential encoding method of performing the non-linear quantization whereby the range of quantization is adjustable according to the colorimetric data and the magnitude thereof.

A circuit arrangement which embodies this invented method as a fourth embodiment of the invention is described below with reference to the accompanying drawings:

FIG. 22 shows the signal transmission and receiving systems of the circuit arrangement of the fourth embodiment of this invention. In the signal transmission system, an adding and subtracting element 310L is arranged to compute a difference between the value of a sampled signal L*i and that of a quantized value L̂*i which is obtained from a preceding picture element and produced from a predictor 312L as a predictive value. A quantizer 314L is arranged to quantize a differential value from the adding and subtracting element 310L by changing one differential quantizing characteristic over to another by the method described above in accordance with the predictive value L̂*i. An encoder 316L is provided with a code table for allotting a code of a suitable length according to the incoming signal and is arranged to encode, according to the code table, a quantized representing value produced from the quantizer 314L. Then, an encoded signal thus obtained is supplied to a transmission line 320L. For example, the encoder 316L allots a variable-length code which is 3/7 of the code shown in FIG. 23. The representing value produced from the quantizer 314L is supplied also to the predictor 312L to be use for a next predicting action. The generic arrangement of the predictor 312L is as shown in FIG. 24.

Referring to FIG. 24, a differential quantization value signal coming to the predictor 312L is produced as a predictive value after it is processed through an adder 370 and a delay circuit 372 which has a delay time corresponding to one picture element. The output of the delay circuit 372 is also supplied to the adder 370 to be added to the other input of the adder 370. As a result, the output of the adder 370 represents the original value of the picture element instead of a differential value.

Referring again to FIG. 22, the coded differential signal transmitted via the transmission line 320L to the signal receiving system is decoded by a decoder 322L. The decoding characteristic of the decoder 322L is determined by the output L̂*i of a predictor 324L disposed within the signal receiving system and corresponds to the encoding table of the encoder 316L of the signal transmission system. An adder 326L is arranged to add the predictive value output L̂*i of the predictor 324L to a decoded signal produced from the decoder 322L and to produce an original picture element signal. The picture element signal from the adder 326L is also supplied back to the predictor 324L to enable the predictor 324L to form a predictive signal L̂*i+1, which is used for the restoration of a next picture element signal.

The circuits for a* and b* are arranged basically in the same manner as the circuit arrangement for L*. Circuit elements for them are indicated by the same reference numerals as those of L̂* processing circuit elements except that these circuit elements for a* and b* are suffixed with "a" or "b" as applicable instead of "L". However, for a* and b*, the quantizing characteristic is changed from one characteristic over to another with reference to the values δa and δb as mentioned in the foregoing. For that purpose, switch circuits 330a and 330b are included in the signal transmission system and similar switch circuits 332a and 332b in the signal receiving system. The values δa and δb depend on the three parameters of L*, a* and b*. Therefore, the switch circuits 330a, 330b, 332a and 332b are arranged to receive predictive values L̂*i, â*i and b̂*i. Since the differential representing values for a* and b* are not large, encoders 316a and 316b may be arranged to use, for example, Huffman type variable-length codes as shown in FIG. 25.

Adaptive type code allotment to the differential representing value for L* is as follows: The value L* is within a range from 0 to 100. Therefore, if an encoding action is performed according to the code table as shown in FIG. 23 when the value of a preceding picture element is 90, for example, representing values and codes encompassed with a broken lines as shown in FIG. 26(A) become useless. Besides, in that case, the existing range of the value L* cannot be completely covered. To solve this problem, therefore, the representating value and the code are arranged to be allotted as shown in FIG. 26(B). The existing range of L* can be completely covered by that arrangement. FIG. 27 shows by way of example a circuit arrangement which is capable of carrying out this allotment method. The circuit arrangement of FIG. 27 is basically the same as the L* processing part of FIG. 22. In FIG. 27, the same circuit elements as those of FIG. 22 are indicated by the same reference numerals. In this instance, the encoder 340 of the signal transmission system is modified to change its encoding characteristic according to the predictive value L*i of the predictor 312L. Therefore, the decoder 322L of the signal receiving system is also arranged to select a decoding characteristic corresponding to the encoding characteristic in accordance with the output L*i of the predictor 324L.

What is claimed is:

1. A color image signal encoding device for compressively encoding a component color image signal consisting of a plurality of different kinds of component signals, comprising:
   a) sampling means for sampling said component color image signal, with respect to every component signal thereof, to form and output a plurality of kinds of sampled signals corresponding to the respective component signals;
   b) a plurality of different kinds of encoding means, each corresponding to one of said component signals and having a plurality of kinds of compression memory tables having respective different quantization characteristics, each of said encoding means being arranged to compressively encode the sampled signal output from said sampling means on the basis of one kind of compression memory table among said plurality of kinds of compression memory tables; and c) compression encoding control means for selecting one kind of compression memory table out of said plurality of kinds of compression memory tables in respective ones of the plurality of different kinds of encoding means according to the image lightness corresponding to said plurality of different kinds of said sampled signals, respectively, output from said sampling means and for compressively encoding the sampled signals output from said sampling means on the basis of the compression memory table selected by the compression encoding control means.

2. A color image signal encoding device according to claim 1, wherein said encoding means includes a predictive encoding means.

3. A color image signal encoding device according to claim 1, wherein said compression memory table includes a quantitizing memory table.

4. A color image signal encoding device according to claim 1, wherein said plurality of different kinds of component signals includes two kinds of color difference signals.

5. A color image signal decoding device for decoding a plurality of kinds of input compressively encoded component color image signals, each consisting of a plurality of different kinds of compressively encoded component signals, comprising:

a) a plurality of kinds of decoding means, each corresponding to one of said compressively encoded component signals and having a plurality of kinds of respective different expansion memory tables, each of said decoding means being arranged to decode said input compressively encoded component signal on the basis of one kind of expansion memory table among said plurality of kinds of expansion memory tables; and b) decoding control means for selecting one kind of expansion memory table out of said plurality of kinds of expansion memory tables in the respective one of the plurality of different kinds of decoding means according to the image lightness corresponding to said compressively encoded color component signal, and for decoding the input compressively encoded component signal on the basis of the expansion memory table selected by the decoding control means, respectively.

6. A color image signal decoding device according to claim 5, wherein said decoding means includes a predictive decoding means.

7. A color image signal decoding device according to claim 5, wherein said expansion memory table includes a decoded memory table.

8. A color image signal decoding device according to claim 5, wherein said plurality of different kinds of compressively encoded component signals includes two kinds of compressively encoded color difference signals.

* * * * *